(12) United States Patent
Cheng et al.

(10) Patent No.: US 10,877,005 B2
(45) Date of Patent: Dec. 29, 2020

(54) METHOD OF MEASURING AN ANALYTE WITH A REDUCTIVE DETECTION WAVEFORM

(71) Applicant: DIONEX CORPORATION, Sunnyvale, CA (US)

(72) Inventors: Jun Cheng, San Jose, CA (US); Yan Liu, Palo Alto, CA (US)

(73) Assignee: Dionex Corporation, Sunnyvale, CA (US)

( * ) Notice: Subject to any disclaimer, the term of this patent is extended or adjusted under 35 U.S.C. 154(b) by 493 days.

(21) Appl. No.: 15/385,738

(22) Filed: Dec. 20, 2016

(65) Prior Publication Data

US 2018/0172621 A1 Jun. 21, 2018

(51) Int. Cl.
*G01N 30/64* (2006.01)
*B01D 15/08* (2006.01)
*G01N 27/49* (2006.01)

(52) U.S. Cl.
CPC ............ *G01N 30/64* (2013.01); *B01D 15/08* (2013.01); *G01N 27/49* (2013.01)

(58) Field of Classification Search
CPC ......... G01N 30/64; G01N 27/49; B01D 15/08
See application file for complete search history.

(56) References Cited

U.S. PATENT DOCUMENTS

| 4,939,924 | A | * | 7/1990 | Johnson | ............... | G01N 27/423 |
| | | | | | | 204/402 |
| 5,403,451 | A | * | 4/1995 | Riviello | ............. | G01N 27/3277 |
| | | | | | | 204/409 |
| 6,225,129 | B1 | | 5/2001 | Liu et al. | | |
| 6,682,701 | B1 | | 1/2004 | Liu et al. | | |
| 6,783,645 | B2 | | 8/2004 | Cheng et al. | | |
| 8,342,007 | B2 | | 1/2013 | Cheng et al. | | |
| 8,636,885 | B2 | | 1/2014 | Vana et al. | | |
| 8,925,374 | B2 | | 1/2015 | Cheng et al. | | |
| 2007/0240998 | A1 | * | 10/2007 | Cheng | ................... | G01N 27/49 |
| | | | | | | 205/775 |
| 2008/0258710 | A1 | * | 10/2008 | Proietti | ................. | G01N 30/64 |
| | | | | | | 324/133 |
| 2010/0258451 | A1 | * | 10/2010 | Adlassnig | .......... | G01N 27/3273 |
| | | | | | | 205/777.5 |

OTHER PUBLICATIONS

Thermo Scientific, Dionex ICS-5000+ Ion Chomatography System Operator's Manual, Document No. 065446, Nov. 2012 (Year: 2012).*

S. M. Steinberg, High-performance liquid chromatography method for determination of hydrogen peroxide in aqueous solution and application to simulated Martian soil and related materials, Environ Monit Assess, vol. 185, pp. 3749-3757 (2013).*

(Continued)

*Primary Examiner* — Maris R Kessel
(74) *Attorney, Agent, or Firm* — Timothy J. Ohara

(57) ABSTRACT

An analyte concentration can be measured at an electrochemical detector using a waveform that includes a reductive voltage. The waveform may include three or four different voltages, in which at least one of the voltage values is reductive. One or more current or charge values can be measured during at least part of a reductive voltage portion of the waveform. The analyte concentration can be calculated based on the measured one or more current or charge values.

10 Claims, 16 Drawing Sheets

(56) References Cited

OTHER PUBLICATIONS

L. K. Tan, et al., Simultaneous Determination of Arsenic(III) and Arsenic(V) in Metallurgical Processing Media by Ion Chromatography with Electrochemical and Conductivity Detectors, Anal. Chem., vol. 58, pp. 1383-1389 (1986).*

Cheng and Liu, "Studies of Matrix Effects on Hydrogen Peroxide Determination Using High Performance Anion Exchange Chromatography with Pulsed Amperometric Detection" at Pittcon Conference, Georgia World Congress Center, Mar. 10, 2016, Atlanta, Georgia, 20 pgs.

De Erenchun et al., "Determination of imidacloprid and its major metabolite in soils by liquid chromatography with pulsed reductive amperometric detection," Analytica Chimica Acta, 349, 199-206, 1997.

* cited by examiner

METHOD OF MEASURING AN ANALYTE WITH A REDUCTIVE DETECTION WAVEFORM

FIELD OF THE INVENTION

The invention generally relates to a method of measuring an analyte with a waveform including a reductive voltage.

BACKGROUND

Chromatography is a widely used analytical technique for the chemical analysis and separation of molecules. Chromatography involves the separation of one or more analyte species from other matrix components present in a sample. A stationary phase of a chromatography column is typically selected so that there is an interaction with the analyte. Such interactions can be ionic, hydrophilic, hydrophobic, or combinations thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped into a chromatography column inlet. During this competition, the analyte and matrix components will elute off of the stationary phase as a function of time and then be subsequently detected at a detector. Examples of some typical detectors are an electrochemical detector, a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various applications such as water quality, environmental monitoring, food analysis, pharmaceutical, and biotechnology.

It may be advantageous to use electrochemical detectors when the analyte of interest has a functional group capable of accepting electrons from a working electrode (i.e., a reduction) or donating electrons to a working electrode (i.e., oxidation). This can be especially useful when the analyte cannot be easily detected with a UV-VIS spectrometer, conductivity detector, or a mass spectrometer. For example, the target analyte may not have functional groups that absorb ultraviolet or visible light. In other examples, the target analyte may be present in an eluent containing a significant amount of ions after the chromatographic separation, which can interfere with both conductivity detectors and mass spectrometers.

In electrochemical detectors, a voltage is selected and applied to the working electrode to promote either a reduction or oxidation to occur. It should be noted that a voltage can be selected that is sufficiently oxidizing or reducing so that analyte can be selectively oxidized or reduced without interference from non-analyte species. The concentration of the analyte generally corresponds to an amount or rate of electrons passing from or to the working electrode. However, under certain circumstances, where the analyte has a reducible functional group, variable amounts of dissolved oxygen in the eluent or sample along with ionic impurities can make it difficult to perform reproducible measurements. It should be noted that dissolved oxygen can interfere because it can be reduced to hydrogen peroxide at a sufficiently reducing voltage.

Arsenic is an example of an analyte that has several different ionic species that are regulated to be as low as 10 ppb (US-EPA) in drinking water. Several forms of arsenic are known to have mutagenic, teratogenic, genotoxic, and neurotoxic effects. For example, inorganic redox species of both arsenite ($As^{III}$) and arsenate ($As^V$) can both be found in environmental waters. Applicant believes that there is a need for new electrochemical methods that can measure both $As^{III}$ and $As^V$ with a single chromatogram using an electrochemical detector in the presence of oxygen.

Hydrogen peroxide is another example of analyte that is used in cosmetics and personal care products (e.g., toothpaste), food processing applications, and as a bleaching agent in the pulp and paper industry. Hydrogen peroxide can be measured with a gold electrode in an alkaline eluent using an oxidation current (power point presentation by Cheng and Liu, "Studies of Matrix Effects on Hydrogen Peroxide Determination Using High Performance Anion Exchange Chromatography with Pulsed Amperometric Detection" at Pittcon Conference, Georgia World Congress Center, Mar. 10, 2016, Atlanta, Ga.). However, under certain circumstances, gold electrodes can become fouled during the oxidation of hydrogen peroxide in the presence of chloride. To overcome this issue, chloride can be removed from the sample using a pretreatment cartridge. Applicant believes that there is a need for an improved method of measuring hydrogen peroxide in the presence of chloride anions without requiring the prior removal of chloride.

Applicant believes that there is a need to develop new voltage waveforms that include a reductive detection voltage for electrochemical detection in chromatography that reduces the effects caused by dissolved oxygen and interferents in the eluent and/or sample.

SUMMARY

A first embodiment of a method for measuring an analyte concentration at an electrochemical detector fluidically coupled to a chromatography column is described. The method includes flowing an eluent and a sample to the chromatography column, in which the sample comprises at least one analyte, and the eluent is acidic. The at least one analyte is separated in the chromatography column and then outputted from the chromatography column to the electrochemical detector. A reductive detection waveform is applied to the electrochemical detector, which includes a working electrode, a reference electrode, an optional counter electrode, and a flow channel. The reductive detection waveform includes a first oxidizing voltage that is applied between the working electrode and the reference electrode for a first predetermined time interval. Immediately subsequent to the first predetermined time interval, a second oxidizing voltage is applied between the working electrode and the reference electrode for a second predetermined time interval, in which the second oxidizing voltage is greater than the first oxidizing voltage. Immediately subsequent to the second predetermined time interval, a reducing voltage is applied between the working electrode and the reference electrode for a third predetermined time interval, in which the analyte is reduced at the working electrode, and the reducing voltage is less than the first oxidizing voltage and the second oxidizing voltage, respectively. Next, one or more current values, or one or more charge values are measured during at least part of the third predetermined time interval. The analyte concentration is calculated based on the measured one or more current values or the measured one or more charge values.

In regards to the first embodiment of the method, it can further include sequentially applying the reductive detection waveform a plurality of times. The one or more current values or the charge can be measured during at least part of the third predetermined time interval for each of the sequentially applied reductive detection waveforms. A signal value can be calculated based on the measured one or more current values or the measured one or more charge values for each of the sequentially applied reductive detection waveforms. The signal value can be displayed as function of time for each of the sequentially applied reductive detection waveforms.

In regards to any of the above first embodiments of the method, the signal value can be based on a sum of the measured current or charge values for each of the sequentially applied reductive detection waveforms.

In regards to any of the above first embodiments of the method, the displayed signal values can form a chromatographic peak corresponding to the analyte.

In regards to any of the above first embodiments of the method, the working electrode includes a material such as gold, platinum, boron doped diamond, silver, and combinations thereof.

In regards to any of the above first embodiments of the method, the eluent contains a chloride ion.

In regards to any of the above first embodiments of the method, it further includes removing at least a portion of a dissolved oxygen component from the eluent using a degasser before the eluent flows to the electrochemical detector.

In regards to any of the above first embodiments of the method, the sample further includes a dissolved oxygen component. The at least one analyte can be separated from the dissolved oxygen component in the chromatography column, in which the at least one analyte outputted to the electrochemical detector has a first retention time. The dissolved oxygen component can be outputted from the chromatography column to the electrochemical detector at a second retention time, in which the first retention time and the second retention time are different.

In regards to any of the above first embodiments of the method, the analyte can be any species with at least one electrochemically reductive functional group, such as peroxide, arsenate, arsenite, nitrotoluene, dinitrotoluene, trinitrotoluene, and combinations thereof.

In regards to any of the above first embodiments of the method, the one or more current values, or the one or more charge values can be measured during a last 50% of the third predetermined time interval.

A second embodiment of a method for measuring an analyte concentration at an electrochemical detector fluidically coupled to a chromatography column is described. The method includes flowing an eluent and a sample to the chromatography column, in which the sample comprises at least one analyte, and the eluent is alkaline. The at least one analyte is separated in the chromatography column, and then outputted from the chromatography column to the electrochemical detector. A reductive detection waveform is applied to the electrochemical detector, which includes a working electrode, a reference electrode, an optional counter electrode, and a flow channel. The reductive detection waveform includes a first reducing voltage that is applied between the working electrode and the reference electrode for a first predetermined time interval, in which the analyte is reduced at the working electrode. Immediately subsequent to the first predetermined time interval, a second reducing voltage is applied between the working electrode and the reference electrode for a second predetermined time interval, in which the second reducing voltage is less than the first reducing voltage. Immediately subsequent to the second predetermined time interval, a first oxidizing voltage is applied between the working electrode and the reference electrode for a third predetermined time interval, in which the first oxidizing voltage is more than the first reducing voltage. Immediately subsequent to the third predetermined time interval, an additional voltage is applied between the working electrode and the reference electrode for a fourth predetermined time interval, in which the additional voltage is less than the first oxidizing voltage. Next, one or more current values or one, or more charge values are measured during at least part of the first predetermined time interval. The analyte concentration is calculated based on the measured one or more current values, or the measured one or more charge values.

In regards to the second embodiment of the method, it can further include sequentially applying the reductive detection waveform a plurality of times. The one or more current values or the charge can be measured during at least part of the first predetermined time interval for each of the sequentially applied reductive detection waveforms. A signal value can be calculated based on the measured one or more current values or the measured one or more charge values for each of the sequentially applied reductive detection waveforms. The signal value can be displayed as function of time for each of the sequentially applied reductive detection waveforms.

In regards to any of the above second embodiments of the method, the signal value can be based on a sum of the measured current or charge values for each of the sequentially applied reductive detection waveforms.

In regards to any of the above second embodiments of the method, the displayed signal values can form a chromatographic peak corresponding to the analyte.

In regards to any of the above second embodiments of the method, the working electrode can includes a material such as gold, platinum, boron doped diamond, silver, and combinations thereof.

In regards to any of the above second embodiments of the method, the eluent contains chloride ion, the electrode includes gold, and the analyte includes hydrogen peroxide.

In regards to any of the above second embodiments of the method, it further includes removing at least a portion of a dissolved oxygen component from the eluent using a degasser before the eluent flows to the electrochemical detector.

In regards to any of the above second embodiments of the method, the sample further includes a dissolved oxygen component. The at least one analyte is separated from the dissolved oxygen component in the chromatography column, in which the at least one analyte outputted to the electrochemical detector has a first retention time. The dissolved oxygen component can be outputted from the chromatography column to the electrochemical detector at a second retention time, in which the first retention time and the second retention time are different.

In regards to any of the above second embodiments of the method, the analyte can be any species with at least one electrochemical reductive functional group, such as peroxide, arsenate, arsenite, nitrotoluene, a dinitrotoluene, trinitrotoluene, and combinations thereof.

In regards to any of the above second embodiments of the method, the one or more current values or the one or more charge values can be measured during a last 50% of the third predetermined time interval.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

DETAILED DESCRIPTION OF EMBODIMENTS

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

A pulsed amperometric detection (PAD) method with a reductive detection potential will be described that allows analytes to be measured. This method can be relatively insensitive to variations in oxygen concentration and has a relatively low background signal compared to a single constant voltage reductive detection methods. Target analytes that have a reducible functional group can be determined using an electrochemical detector with a voltage waveform that includes a reductive voltage. In addition, such methods can increase the response of the reducible analytes and increase long term response stability in comparison to a method of using a single constant voltage. In many instances, mercury or mercury gold amalgam electrode materials are used with reductive voltages to decrease the effects of oxygen. However, mercury is undesirable due to its toxicity and disposal issues. It should be noted that the reduction waveforms described herein can be used with electrodes such as platinum, gold, carbon, silver, and boron doped diamond, and combinations thereof.

Figure 14:
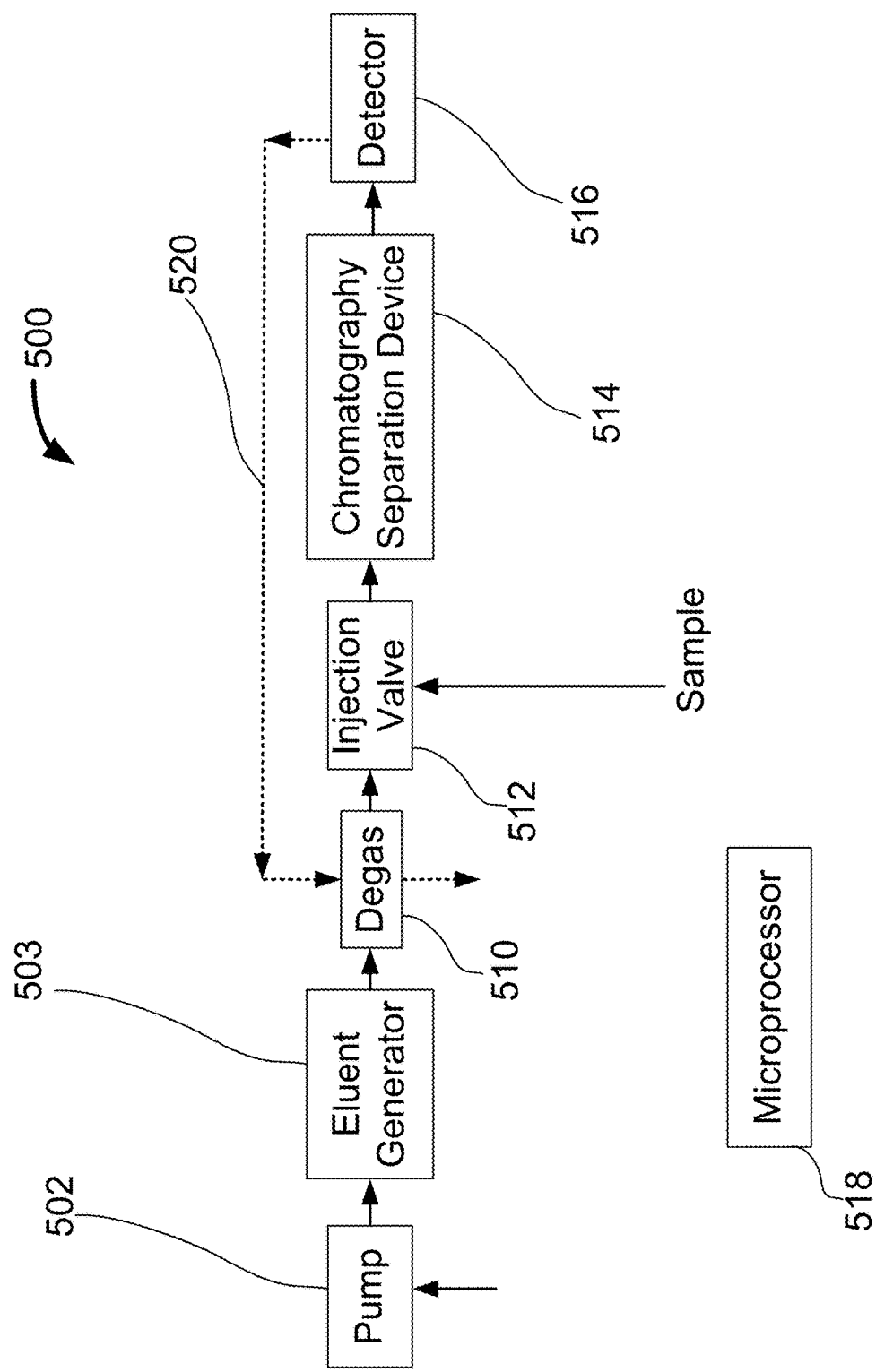
FIG. 14 shows an ion chromatography system suitable for analyzing samples with an ion exchange chromatography column and an electrochemical detector using waveforms described herein that include a reductive voltage.

The following will describe chromatography systems suitable for use with the waveforms that includes a reductive voltage. FIG. 14 illustrates an embodiment of a chromatography system, which is an ion chromatography system 500 that includes a pump 502, an electrolytic eluent generating device 503, a degas assembly 510, an injection valve 512, a chromatography separation device 514, a detector 516, and a microprocessor 518. A recycle line 520 may be used to transfer the liquid from an output of detector 516 to a regenerant channel of degas assembly 510. The degas assembly can be a vacuum degasser.

Pump 502 can be configured to pump a liquid from a liquid source and be fluidically connected to electrolytic eluent generating device 503. Electrolytic eluent generating device 503 is configured to generate an eluent such as for example KOH or methanesulfonic acid. Details regarding electrolytic eluent generating devices (e.g., eluent generator) can be found in U.S. Pat. Nos. 6,225,129 and 6,682,701, which are hereby incorporated by reference herein. In an embodiment, a residual gas may be carbon dioxide, hydrogen, and oxygen. The gas can be swept out of degas assembly 510 using a recycled liquid via a recycle line 520 that is downstream of detector 516. Injection valve 512 can be used to inject an aliquot of a sample into an eluent stream. Chromatography separation device 514 (e.g., ion exchange chromatography column) can be used to separate various matrix components present in the liquid sample from the analytes of interest. An output of chromatography separation device 514 can be fluidically connected to detector 516 to measure the presence of the separated chemical constituents of the liquid sample. Chromatography separation device 514 can separate one or more analytes of a sample that is outputted from chromatography separation device 514 at different retention times.

Detector 516 can be in the form of an electrochemical detector that includes a flow channel configured to be in fluidic contact with at least a working electrode, a reference electrode, and optionally a counter electrode. Details regarding an electrochemical detector flow cell and a disposable working electrode can be found in U.S. Pat. Nos. 8,925,374; 8,342,007; and 6,783,645, which are hereby fully incorporated by reference herein. The electrochemical detector also includes a potentiostat or an analytic device to apply a voltage waveform across the working electrode and reference electrode, and optionally passes a current between the counter electrode and working electrode. Details regarding an analytic device to apply a voltage waveform can be found in U.S. Pat. No. 8,636,885, which is hereby fully incorporated by reference herein.

An electronic circuit may include microprocessor 518 and a memory portion. Microprocessor 518 can be used to control the operation of chromatography system 500. Microprocessor 518 may either be integrated into chromatography system 500 or be part of a personal computer that communicates with chromatography system 500. Microprocessor 518 may be configured to communicate with and control one or more components of chromatography system such as pump 502, electrolytic eluent generating device 503, injection valve 512, and detector 516. Memory portion can contain instructions on the magnitude, polarity, and timing for how to apply one or more voltage waveforms such as, for example, the reductive detection waveforms described herein. In terms of measurement, memory portion can also contain instructions regarding which time periods to sample current values to integrate the signal and/or measuring a total charge for a particular time period.

Now that an ion chromatography system has been described, the following will describe another embodiment of a chromatography system, which is a liquid chromatography system. Liquid chromatography system 600 is similar to ion chromatography system 500. However, liquid chromatography system 600 is different in that it does not include an eluent generator. Further, degas assembly 610 is optional, but is often placed upstream of pump 602. The samples analyzed with liquid chromatography can be ionically charged and/or neutral whereas ion chromatography typically separates ions.

Figure 15:
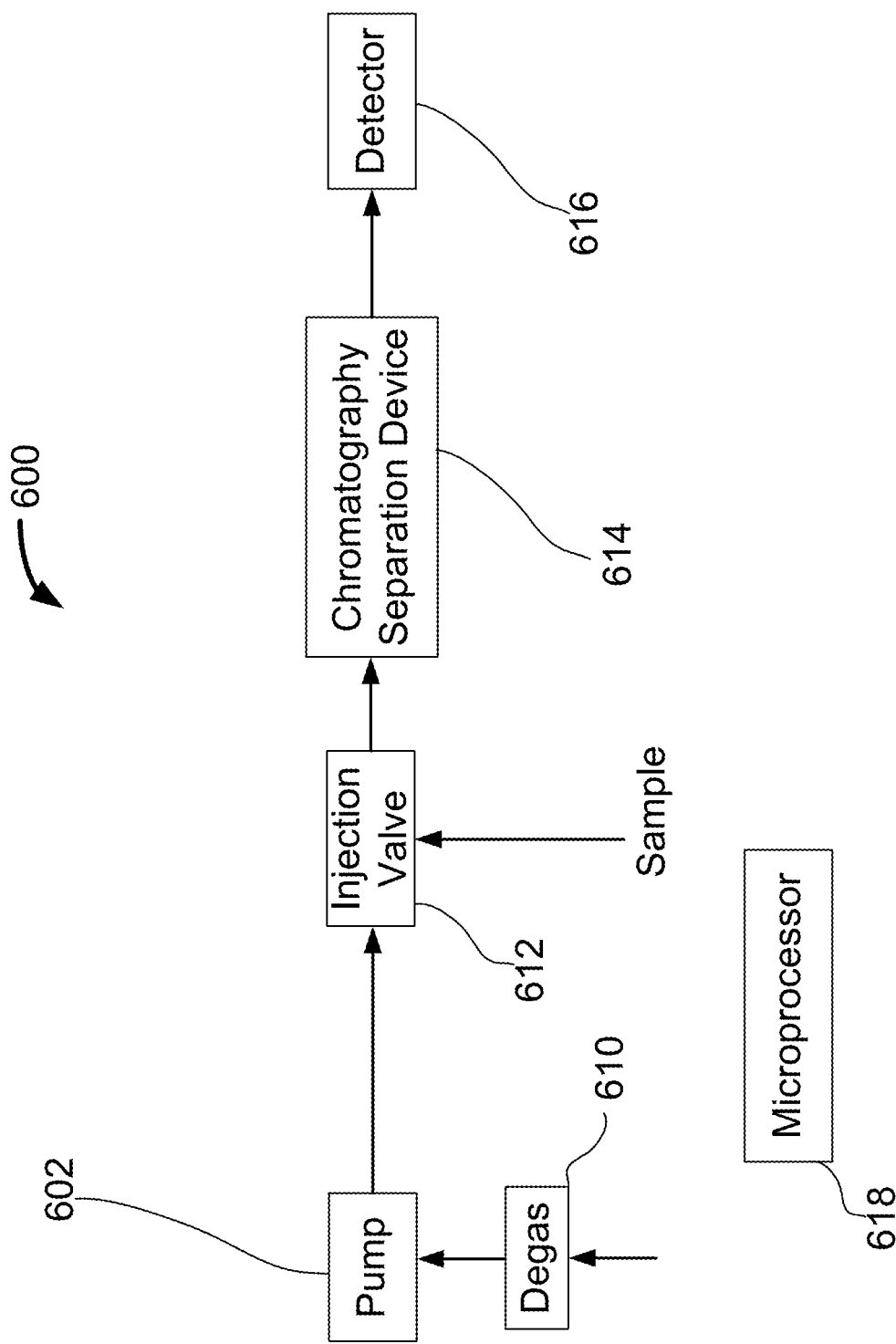
FIG. 15 shows a liquid chromatography system suitable for analyzing samples with a chromatography column and an electrochemical detector using waveforms described herein that include a reductive voltage.

FIG. 15 illustrates an embodiment of a liquid chromatography system 600 that includes a pump 602, a degas assembly 610, an injection valve 612, a chromatography separation device 614, a detector 616, and a microprocessor 618. Pump 602 can be fluidically connected to injection valve 612. Injection valve 612 can be used to inject an aliquot of a liquid sample into an eluent stream and then to chromatography separation device 614 (e.g., chromatography column) to separate various matrix components present in the liquid sample from the analytes of interest. An output of chromatography separation device 614 can be fluidically connected to detector 616 to measure the presence of the separated chemical constituents of the liquid sample. It should be noted that chromatography systems 500 and 600 are particular examples of machines used to analyze standard solutions and sample solutions to identify chemical constituents and the associated concentration values.

Figure 1:
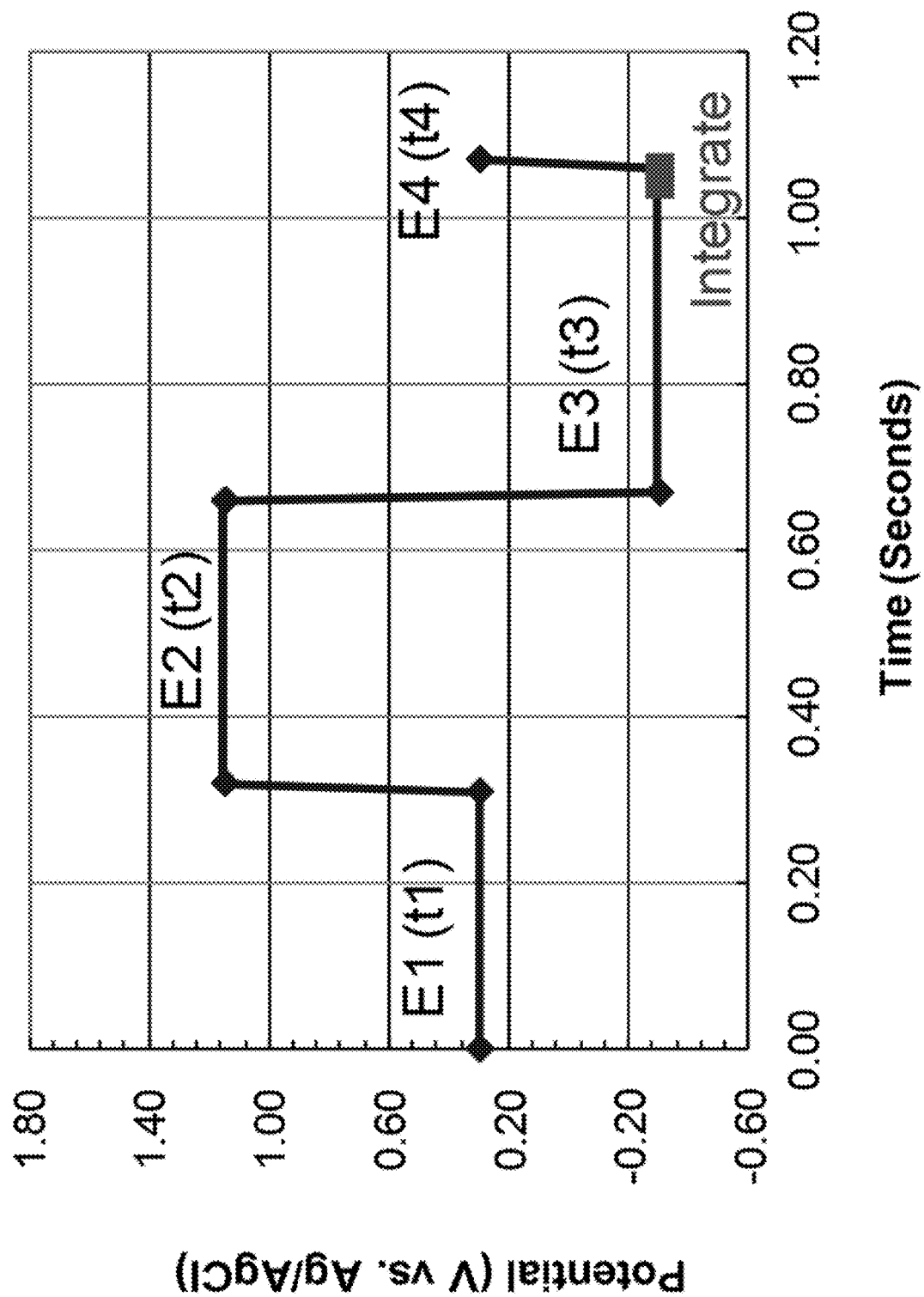
FIG. 1 shows an embodiment of a first reductive detection waveform where an integration of signal occurs towards the end of the third voltage and is suitable for use in acidic conditions.

Now that the ion and liquid chromatography systems have been generally described, the following will describe the method of applying a voltage waveform that includes a reductive voltage to the electrochemical detector. FIG. 1 shows a first embodiment of a reductive detection waveform that includes a reductive voltage where an integration of signal occurs towards the end of the third voltage (E3) and is suitable for use in acidic conditions (e.g., pH<6) with a platinum electrode. In an embodiment, an acidic eluent may have a pH less than 6, preferably less than 5, more preferably less than 4, and yet more preferably less than 3. Table 1 illustrates the magnitude and the polarity of the applied potentials (i.e., voltage) and the associated time intervals. In addition, Table 1 illustrates the time intervals for integrating the signal for the first embodiment.

TABLE 1

| Time (s) | Potential (V) | Integration |
|----------|---------------|-------------|
| 0.00 | +0.30 | |
| 0.31 | +0.30 | |
| 0.32 | +1.15 | |
| 0.66 | +1.15 | |
| 0.67 | −0.30 | |
| 0.86 | −0.30 | Start |
| 1.06 | −0.30 | End |
| 1.07 | +0.30 | |

It should be noted that terms voltage and potential are used interchangeably. As used herein, a more positive potential generally indicates an increase in oxidizing potential and a less positive potential generally indicates an increase in reducing potential. An oxidizing voltage can refer to a voltage that causes an electron to be removed from an analyte that can be measured in terms of an oxidizing current or oxidative charge. A reducing voltage can refer to a voltage that causes an electron to be added to an analyte that can be measured in terms of a reducing current or reductive charge. Typically, an applied voltage that is less than the standard potential of the analyte will cause a reduction whereas an applied voltage that is more than the standard potential of the analyte will cause an oxidation. However, in different circumstances, an oxidizing voltage can refer to a voltage that causes a surface layer on the electrode to be oxidized and a reducing voltage can refer to a voltage that causes a surface layer on the electrode to be reduced. An oxidation or reduction of the surface layer on the electrode can be used to clean the electrode for increasing long-term stability.

It should be noted that reductive detection waveform refers to a voltage waveform having a plurality of applied voltage steps where there is at least one reductive voltage step and that the current or charge is measured during at least a portion of this step. In an embodiment, the reductive detection waveform may also include an oxidative voltage step to clean and/or condition the electrode.

A second reductive detection waveform can be similar to the first reductive detection waveform except that the third reducing voltage has a more positive value. Table 2 illustrates the magnitude and the polarity of the applied potentials (i.e., voltage) and the associated time intervals. In addition, Table 2 illustrates the time intervals for integrating the signal for the second reductive detection waveforms.

TABLE 2

| Time (s) | Potential (V) | Integration |
|---|---|---|
| 0.00 | +0.30 | |
| 0.31 | +0.30 | |
| 0.32 | +1.15 | |
| 0.66 | +1.15 | |
| 0.67 | −0.23 | |
| 0.86 | −0.23 | Start |
| 1.06 | −0.23 | End |
| 1.07 | +0.30 | |

Figure 2:
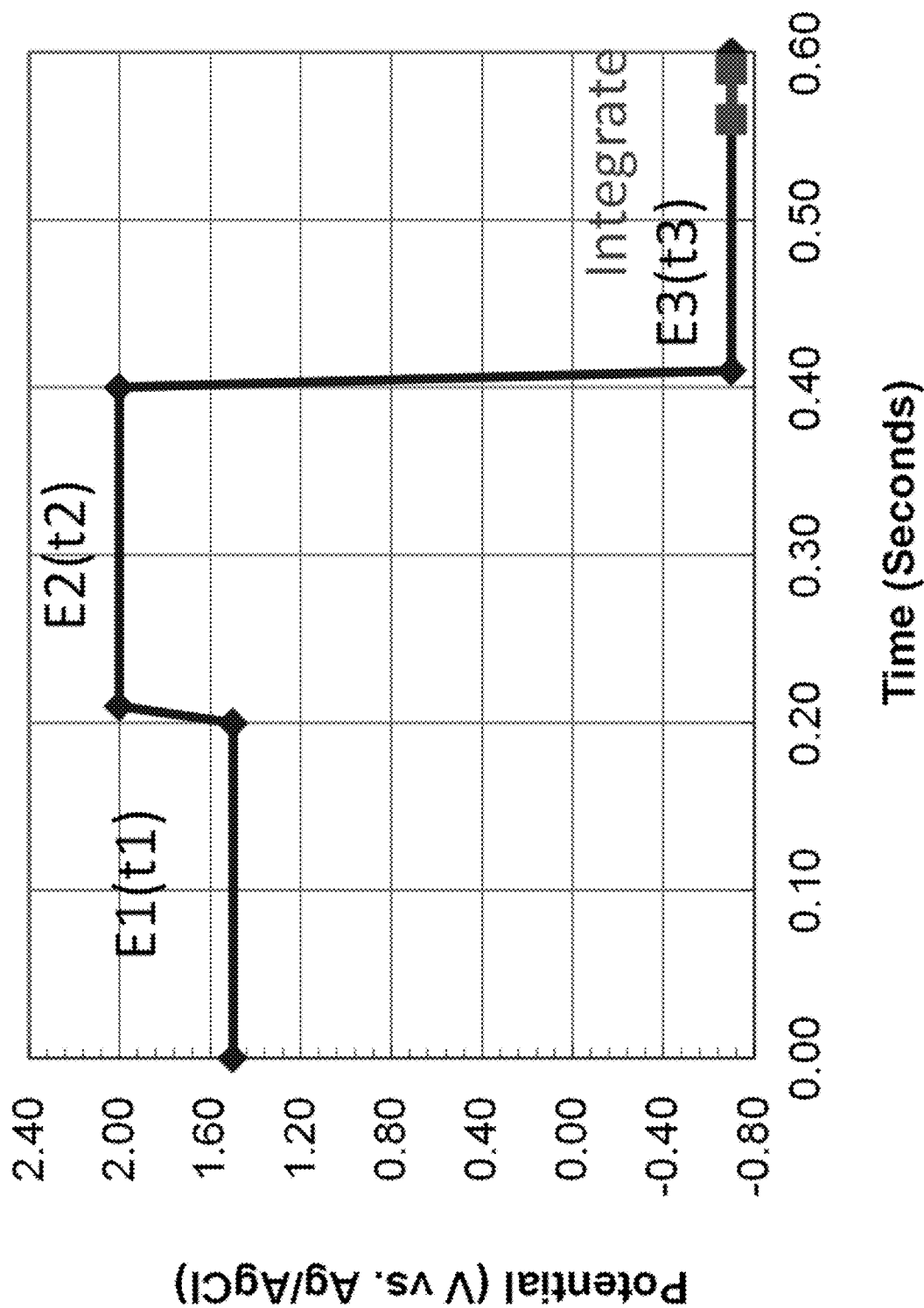
FIG. 2 shows an embodiment of a third reductive detection waveform where an integration of signal occurs towards the end of the third voltage and is suitable for use in acidic conditions.

FIG. 2 shows a third reductive detection waveform that includes a reductive voltage where an integration of signal occurs towards the end of the third voltage and is suitable for use in acidic conditions with boron doped diamond (BDD) electrode. The first and second oxidizing voltages of the third embodiment have more positive values than the corresponding first and second oxidizing voltages of the first and second reductive detection waveforms, respectively. Similarly, the third reducing voltage of the third reductive detection waveform has a more negative value than the corresponding third reducing voltage of the first and second reductive detection waveforms, respectively. In addition, a boron doped diamond (BDD) electrode can be used with the third embodiment. Table 3 illustrates the magnitude and the polarity of the applied potentials (i.e., voltage) and the associated time intervals. In addition, Table 3 illustrates the time intervals for integrating the signal for the third reductive detection waveform.

TABLE 3

| Time (s) | Potential (V) | Integration |
|---|---|---|
| 0.00 | 1.50 | |
| 0.20 | 1.50 | |
| 0.21 | 2.00 | |
| 0.40 | 2.00 | |
| 0.41 | −0.70 | |
| 0.56 | −0.70 | Start |
| 0.59 | −0.70 | End |
| 0.60 | −0.70 | |

Figure 3:
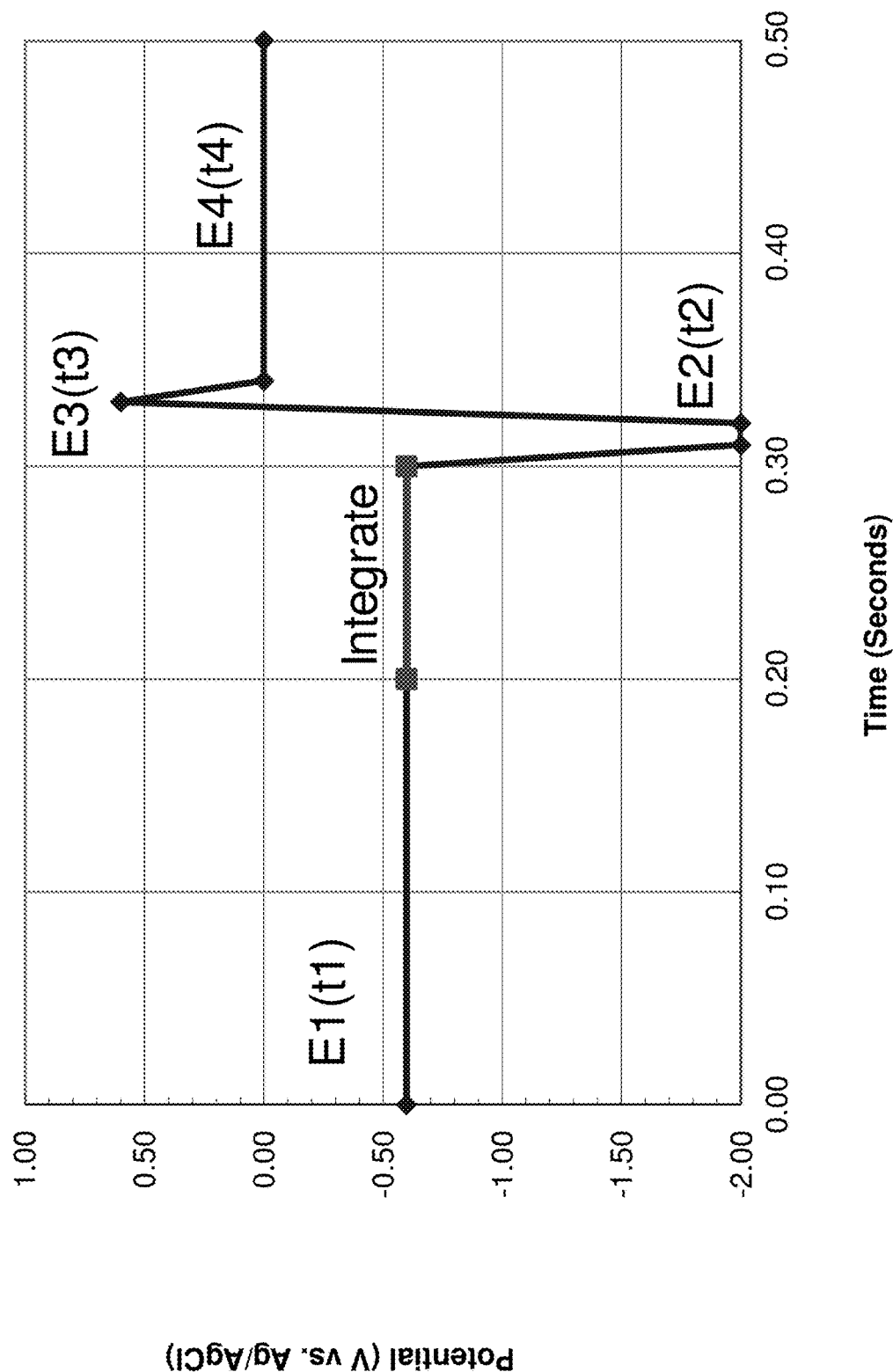
FIG. 3 shows an embodiment of a fourth reductive detection waveform where an integration of signal occurs towards the end of the first voltage and is suitable for use in alkaline conditions.

FIG. 3 shows an embodiment of a fourth reductive detection waveform where an integration of signal occurs towards the end of the first voltage and is suitable for use with an alkaline eluent (i.e., pH>8) and a gold electrode. Unlike the first, second, and third reductive detection waveforms, this embodiment has one additional voltage step and is suitable for use in alkaline eluent and a gold electrode. In an embodiment, an alkaline eluent may have a pH greater than 8, preferably greater than 9, more preferably greater than 10, and yet more preferably greater than 11. Table 4 illustrates the magnitude and the polarity of the applied potentials (i.e., voltage) of the four discrete voltage values and the associated time intervals. In addition, Table 4 illustrates the time intervals for integrating the signal for this embodiment. It should be noted that the fourth voltage (E4) that is referred to as an "additional voltage" and may be neither strongly oxidizing nor strongly reducing. The "additional voltage" may have a value close to zero and be weakly reducing compared to the first voltage (E1). In this case, weakly reducing means that the additional voltage is larger in magnitude compared to the first voltage.

TABLE 4

| Time (s) | Potential (V) | Integration |
|---|---|---|
| 0.00 | −0.60 | |
| 0.20 | −0.60 | Start |
| 0.30 | −0.60 | End |
| 0.31 | −2.00 | |
| 0.32 | −2.00 | |
| 0.33 | +0.60 | |
| 0.34 | 0 | |
| 0.50 | 0 | |

For the first, second, and third reductive detection waveforms, the eluent or mobile phase can be acidic (i.e., pH<6) and flowed from the chromatography column to the electrochemical detector. The method includes may include applying three discrete constant voltages to an electrochemical detector. More specifically, the voltages are applied between the working electrode and the reference electrode. The reductive detection waveform can include a first oxidizing voltage (E1), a second oxidizing voltage (E2), and a third reducing voltage (E3). The first oxidizing voltage (E1) can be applied between the working electrode and the reference electrode for a first predetermined time interval (t1). Immediately subsequent to the first predetermined time interval (t1), a second oxidizing voltage (E2) can be applied between the working electrode and the reference electrode for a second predetermined time interval (t2). In an embodiment, the second oxidizing voltage (E2) is greater than the first oxidizing voltage (E1). Immediately subsequent to the second predetermined time interval (t2), a reducing voltage (E3) is applied between the working electrode and the reference electrode for a third predetermined time interval (t3), in which the analyte is reduced at the working electrode. In an embodiment, the reducing voltage (E3) is less than the first oxidizing voltage (E1) and the second oxidizing voltage (E2), respectively. In regards to FIG. 1, it should be noted that the fourth voltage (E4) has a same value as the first voltage (E1) indicating the start of a subsequent waveform. It should be noted that the applied voltage may be a constant value during the first, second, or third predetermined time interval where a constant value can mean that the magnitude of the voltage does not vary by more than 5%.

For the first, second, and third reductive detection waveforms, the first predetermined time interval may range from about 0.02 to about 2 seconds, and preferably range from about 0.2 seconds to about 0.3 seconds. Similarly, the second predetermined time interval may range from about 0.02 to about 2 seconds, and preferably be about 0.35 seconds. The third predetermined time interval may range from about 0.02 to about 2 seconds, and preferably be about 0.4 seconds.

For the first, second, and third reductive detection waveforms, one or more current or charge values can be measured during at least part of the third predetermined time interval. In an embodiment, the current or charge values may be sampled at the last 50% of the third time interval. By sampling the current or charge towards the end of the third predetermined time interval, this allows the charging current to decrease so that the sampled current or charge will correspond more accurately to the analyte concentration. The sampling frequency may range from about 0.1 to about 1000 points per second. Typically, charge values can be collected and counted at a capacitor for a portion of the third predetermined time interval. It should be noted that in order reduce the use of memory, the method may sample current or charge only in a portion of the third predetermined time interval and not sample current or charge in the first and second predetermined time intervals.

The voltage waveform can be sequentially applied a plurality of times. Immediately after one voltage waveform is completed another voltage can be initiated in a recurring manner. In an embodiment, a voltage waveform can be performed in a total time duration ranging from about 0.1 seconds to about 10 second, and preferably ranging from about 0.5 seconds to about 1.1 seconds. The voltage waveform can have a frequency ranging from about 0.1 waveforms per second to about 10 waveforms per second, and preferably ranging from about 0.9 waveforms per second to about 2 waveforms per second.

A signal value can be calculated based on the measured one or more current values, or the measured one or more charge values for each of the sequentially applied voltage waveforms. In one embodiment, the signal value is based on a sum of the measured current or charge values. The summation of current values would be proportional to the charge measured by the working electrode. Each signal value can represent a data point plotted as a function of time to display a chromatogram. A plurality of displayed signal values can form a chromatographic peak corresponding to an analyte. Each sequentially measured signal value represents a dot that can be connected with a line to form the shape of a chromatographic peak. The retention time corresponds to the time in which the chromatographic peak maxima occurs. The retention time provides a reference point that indicates the amount of time for the analyte to elute off of the chromatographic column compared to other analytes and matrix species. The analyte concentration can be calculated based on the measured one or more current values, or the measured one or more charge values. More specifically, the peak area or peak height can be used to calculate the concentration of the analyte. It should be noted that the magnitude of the peak area or peak height are based on the calculated signal values, which in turn are based on the measured one or more current values or the measured one or more charge values. It should also be noted that reduction currents may be denoted as a negative value. However, for illustration or calculation purposes, an absolute value of the reducing current or the reductive charge values can be used to display analyte responses in a chromatogram or a calibration plot.

In an embodiment, the working electrode can include gold, platinum, boron dope diamond, silver, and a combination thereof. It should be noted that the above noted electrodes are easier to use and less toxic than mercury and mercury/gold electrodes.

Figure 4:
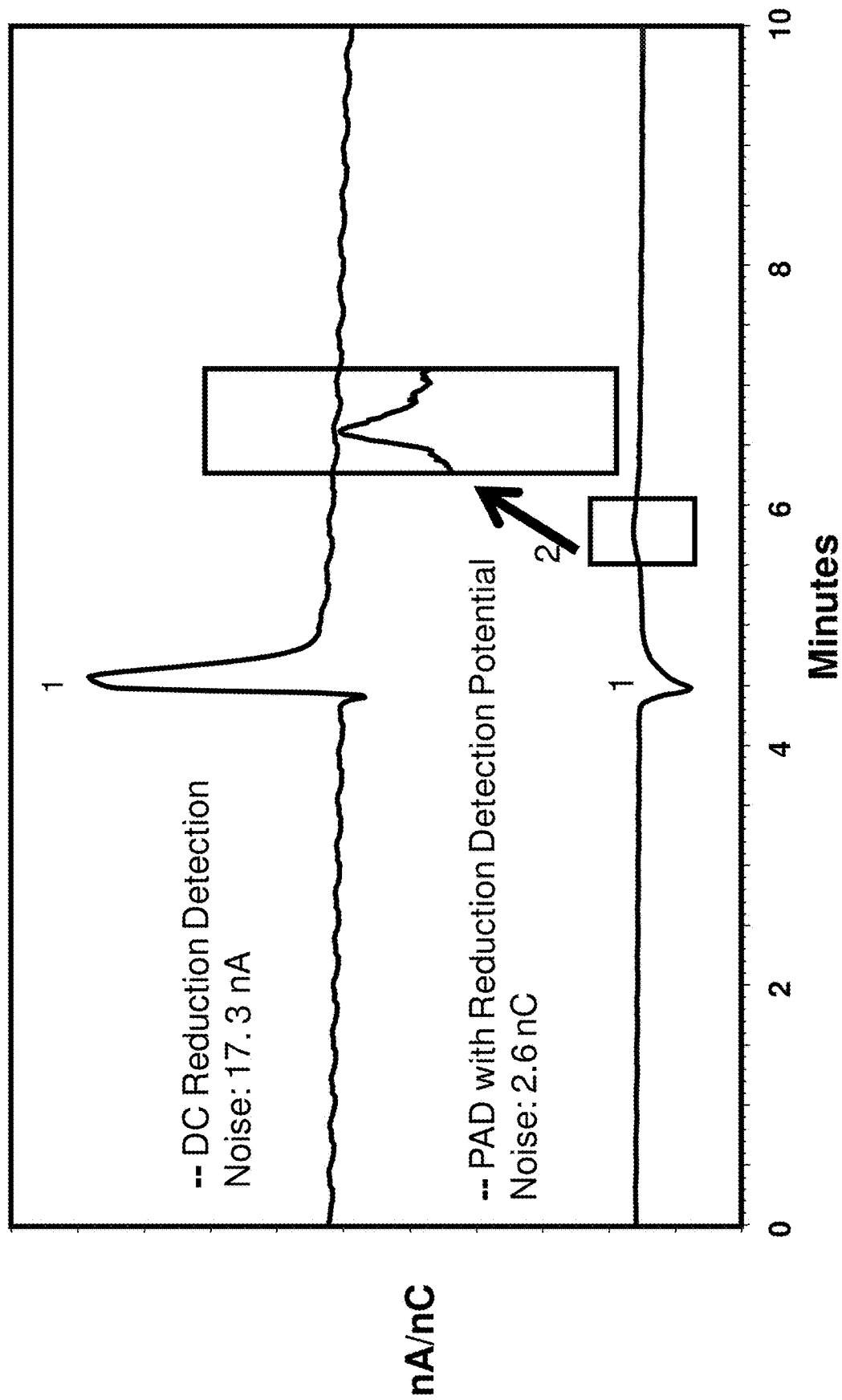
FIG. 4 shows a chromatogram (upper trace) where an arsenate sample was injected and the detector was poised at a single reductive voltage compared to another chromatogram (lower trace) that detected an arsenate peak with the first reductive detection waveform of FIG. 1. Peak 1—void volume peak and Peak 2—arsenate ($As^{5+}$).

Under certain circumstances, the reduction of residual oxygen in the eluent can interfere with measuring the analyte with a DC constant reductive voltage (upper trace in FIG. 4). On the other hand, with a reductive detection waveform with pulsed amperometric detection (PAD), the interference can be reduced (bottom trace in FIG. 4). In an embodiment, a vacuum degasser can be used to remove at least a portion of oxygen from the eluent before the eluent flows to the electrochemical detector. Although a vacuum degasser typically does not remove all of the oxygen, it helps to reduce a magnitude of a background current.

In addition to the eluent, the sample can contain oxygen too. Thus, if the sample is not degassed prior to injection, oxygen can be introduced during a sample injection into the injection valve. Applicant has observed that certain chromatography columns separate a dissolved oxygen component from the analyte. For example, in FIG. 7, peak 3 represents the dissolved oxygen component eluting at about 13 minutes and peak 2 represents hydrogen peroxide eluting at about 8 minutes. Surprisingly, Applicant has found that the reductive detection waveforms described herein are capable of measuring analytes such as hydrogen peroxide in the presence of oxygen in the sample.

Certain chromatography column may require an alkaline (i.e., pH>8) eluent to separate the analyte. For example, hydrogen peroxide can be separated using an alkaline eluent containing chloride with a gold electrode. Under such conditions, Applicant has found that gold electrodes can become fouled causing electrode response instability, especially for samples containing chloride ions. Applicant believes that the following reaction (see Equation 1 below) may be occurring when subjecting the electrode to oxidizing potentials. Applicant observed that sputtered gold electrodes formed a visibly black surface layer which indicated fouling when the electrodes were subjected to hydrogen peroxide oxidation in an alkaline eluent containing chloride.

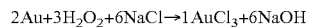

$$2Au + 3H_2O_2 + 6NaCl \rightarrow 1AuCl_3 + 6NaOH \qquad (Eq.\ 1)$$

Thus, hydrogen peroxide and NaCl may be causing gold to be oxidized and removed from the electrode causing a reduced electrode response. Applicant also believes that this oxidation can be reduced by using a waveform with a relatively short time interval duration for an oxidizing voltage. For example, the waveform cited in Table 4 has an oxidizing voltage for 2% of the total time duration of the waveform (0.01 seconds for E3/0.5 seconds for E1 to E4). The relatively short oxidizing voltages applied in Table 4 provided for cleaning and conditioning of the electrode without causing fouling. Applicant has found that using a waveform that has an oxidizing voltage for about 80% of the total time duration of the waveform with a gold electrode in the presence of alkaline eluent and hydrogen peroxide results in electrode fouling when used to analyze samples containing chloride ions (see EXAMPLE 6).

In an embodiment, the eluent or mobile phase is alkaline (i.e., pH>8) and flowed from the chromatography column to the electrochemical detector. The method includes applying a voltage waveform to an electrochemical detector. The fourth reductive detection waveform can include a first reducing voltage (E1), a second reducing voltage (E2), a first oxidizing voltage (E3), and another voltage (E4), as illustrated in FIG. 3. The first reducing voltage (E1) can be applied between the working electrode and the reference electrode for a first predetermined time interval (t1), in which the analyte is reduced at the working electrode. Immediately subsequent to the first predetermined time interval (t1), a second reducing voltage (E2) can be applied between the working electrode and the reference electrode for a second predetermined time interval (t2), in which the second reducing voltage is less than the first reducing voltage. Immediately subsequent to the second predetermined time interval (t2), a first oxidizing voltage (E3) is applied between the working electrode and the reference electrode for a third predetermined time interval (t3). In an embodiment, the first oxidizing voltage is more than the first reducing voltage. Immediately subsequent to the third predetermined time interval (t3), an additional voltage (E4) is applied between the working electrode and the reference electrode for a fourth predetermined time interval (t4). In an embodiment, the additional voltage is less than the first oxidizing voltage. In another embodiment, the additional voltage can be less than the first oxidizing voltage and greater than the first reducing voltage. It should be noted that the applied voltage may be a constant value during the first, second, third predetermined, or fourth time interval where a constant value can mean that the magnitude of the voltage does not vary by more than 5%.

For the fourth reductive detection waveform, the first predetermined time interval may range from about 0.02 to about 5 seconds, and preferably be about 0.3 seconds. Similarly, the second predetermined time interval may range from about 0.02 to about 5 seconds, and preferably range from about 0.01 to about 0.02 seconds. The third predetermined time interval may range from about 0.01 to about 0.02 seconds, and preferably be about 0.01 seconds. The fourth predetermined time interval may range from about 0.02 to about 5 seconds, and preferably be about 0.16 seconds.

For the fourth reductive detection waveform, one or more current values, or one or more charge values can be measured during at least part of the first predetermined time interval. In an embodiment, the current values can be sampled at the last 50% of the first time interval. By sampling the current towards the end of the first predetermined time interval, this allows the charging current to decrease so that the sampled current will correspond more accurately to the analyte concentration. The sampling frequency may range from about 0.1 to about 1000 points per second. Typically, charge values can be collected and counted at a capacitor for a portion of the first predetermined time interval. It should be noted that in order reduce the use of memory, the method may sample current or charge only in the first predetermined time interval and not sample current or charge in the second, third, and fourth predetermined time intervals.

Applicant found that the use of a fourth reductive detection waveform with a gold electrode in an alkaline solution resulted in improved hydrogen peroxide measurements. The stability of the response improved and the electrodes did not foul even in the presence of chloride in the sample. Further, this method is capable of measuring hydrogen peroxide in the presence of oxygen in the sample.

Example 1

Chromatograms were measured with arsenate injections with an applied constant voltage (upper trace) and a first reductive detection waveform of Table 1 (lower trace) in an acidic eluent, as shown in FIG. 4. A liquid chromatography system was assembled in a format similar to FIG. 15, which in this case was a Thermo Scientific Dionex ICS-5000 system with an electrochemical detector (commercially available from Thermo Fisher Scientific, Sunnyvale, Calif.).

The experimental conditions included:
Eluent: 10 mM $H_2SO_4$
Column: IonPac™ ICE-AS1 (4×250 mm)
Flow rate: 0.20 mL/min
Temperature: 30° C.
Injection Volume: 20 µL
Reference electrode: Ag/AgCl
Working electrode: Pt
Detection Method: a. constant voltage of −0.30 V (upper trace of FIG. 4), b. first reductive detection waveform of Table 1 (lower trace of FIG. 4)
Samples: 100 ppb of Arsenate in 10 mM $H_2SO_4$
Peaks:
1. Void volume peak
2. Arsenate The IonPac™ ICE-AS1 column is an ion exclusion column that includes a 7.5 µm cross-linked styrene/divinylbenzene resin that is functionalized with sulfonate groups. The chromatogram (upper trace of FIG. 4) using a constant voltage of −0.3 V showed a relatively large background and a noise value of 17.3 nanoamps (nA). It should be noted that only a single constant voltage was applied for the entire ten minute time duration of the chromatogram (upper trace of FIG. 4). Applicant believes that the dissolved oxygen interfered with the reductive detection of arsenate, and thus, a hydrogen peroxide peak is not observed when a single constant voltage was applied. On the other hand, the chromatogram (lower trace of FIG. 4) using the first reductive detection waveform form of Table 1 showed a relatively low noise value of 2.6 nanocoulombs (nC) and a chromatographic peak at about 7.5 minutes was observed that corresponds to arsenate. A void volume or exclusion volume represents an amount of time required for an unretained species to be swept through the column from the injector to the detector.

Example 2

Figure 5:
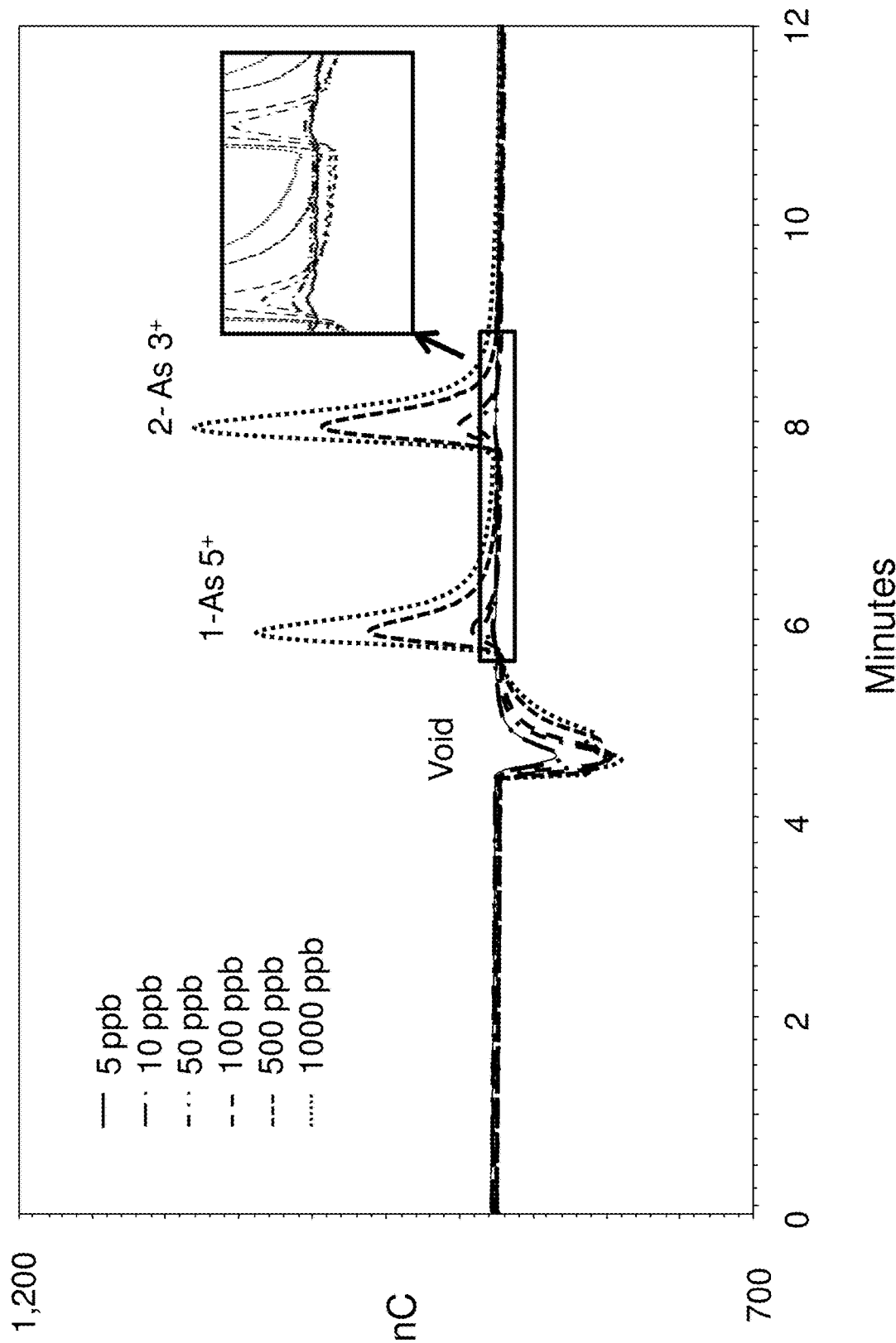
FIG. 5 shows a series of chromatograms using an embodiment of a second reductive detection waveform (see Table 2) that is similar to FIG. 1 except that the third voltage is −0.23 volts. The sample includes various concentrations of arsenate ($As^{5+}$, Peak 1) and arsenite ($As^{3+}$, Peak 2) from 5 ppb to 1000 ppb.
Figure 6:
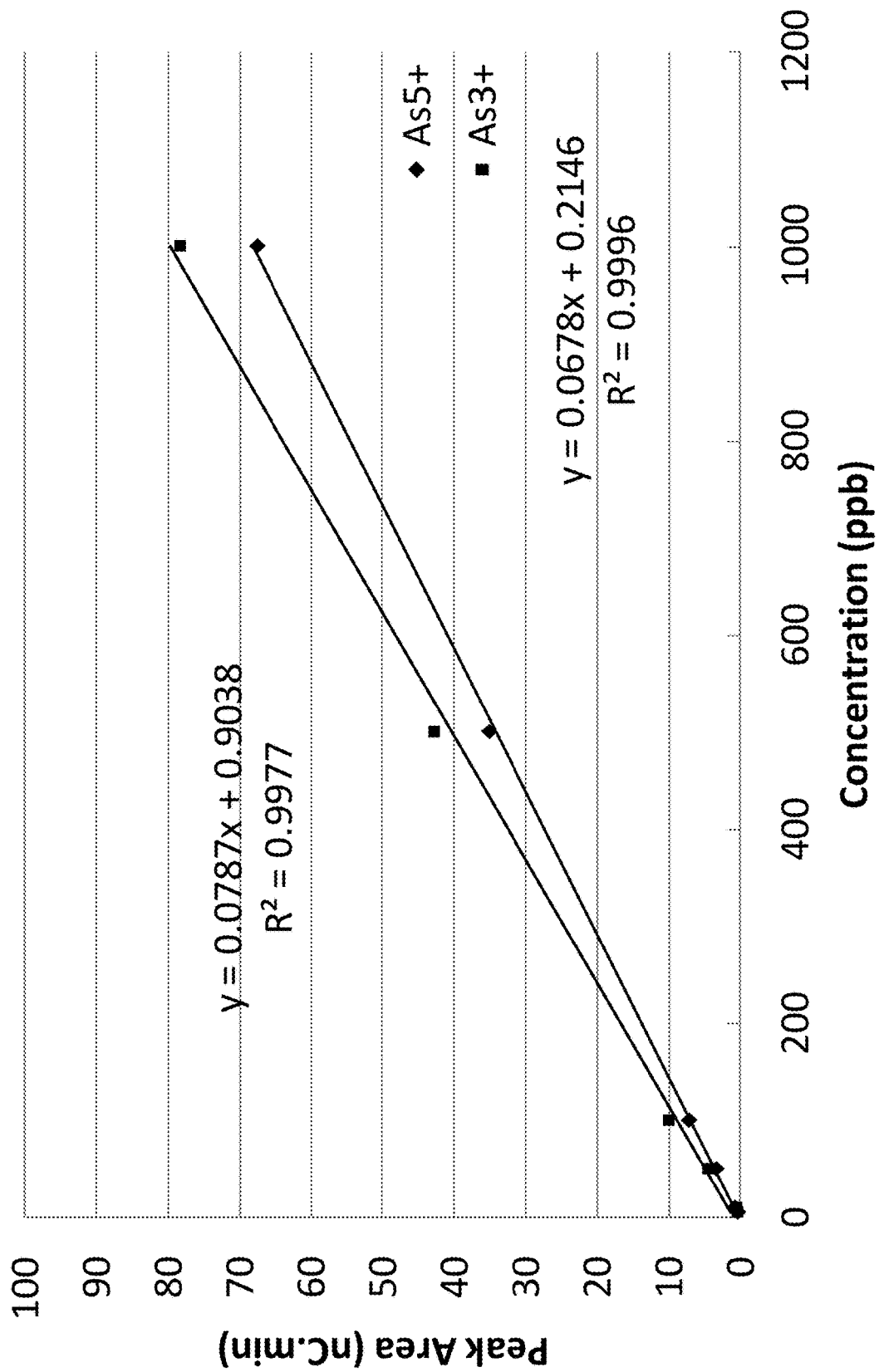
FIG. 6 shows two linear calibration plots of arsenate (diamonds—$As^{5+}$) and arsenite (squares—$As^{3+}$) that correspond to the peak areas from the chromatograms of FIG. 5.

In FIG. 5, a series of chromatograms were measured with a sample containing both arsenate and arsenite using the second reductive detection waveform of Table 2 in an acidic eluent along with a platinum working electrode. A liquid chromatography system was assembled and operated under conditions similar to EXAMPLE 1. The tested sample solutions contained both arsenate ($5^+$, Peak 1) and arsenite ($3^+$, Peak 2), where each ionic species of arsenic was at an equal concentration. The sample solution had one of the following concentrations for each of the arsenic species, which are 5, 10, 50, 100, 500 and 1000 ppb arsenite and arsenate in 10 mM $H_2SO_4$. FIG. 6 shows two linear calibration plots of arsenate (diamonds—$As^{5+}$) and arsenite (squares—$As^{3+}$) that correspond to the chromatograms of FIG. 5. FIGS. 5 and 6 indicate that arsenate ($5^+$, Peak 1) and arsenite ($3^+$, Peak 2) can be separated and measured in a chromatographic separation using the second reductive detection waveform of Table 2. Thus, arsenate and arsenite can be analyzed in a single chromatogram.

Example 3

Figure 7:
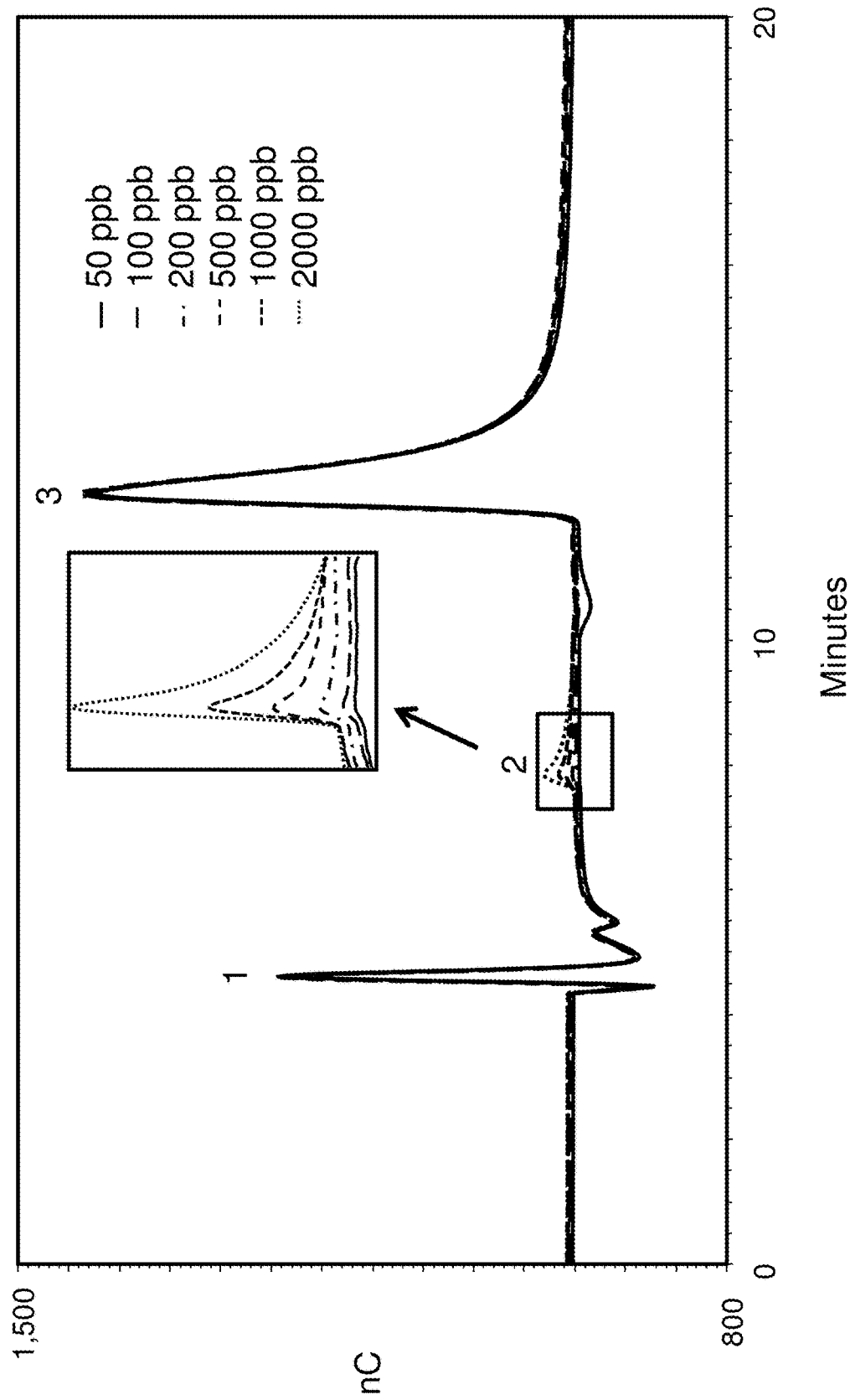
FIG. 7 shows a series of chromatograms using the first reductive detection waveform of FIG. 1 where the sample includes various concentrations of hydrogen peroxide from 50 ppb to 2000 ppb. Peak 1—void volume peak, Peak 2—hydrogen peroxide, and Peak 3—oxygen.

In FIG. 7, a series of chromatograms were measured with a sample containing hydrogen peroxide using the first reductive detection waveform of Table 1 in an acidic eluent along with a platinum working electrode. A liquid chromatography system was assembled and operated under conditions similar to EXAMPLE 1. The detection method used the first reductive detection waveform of Table 1.

Figure 8:
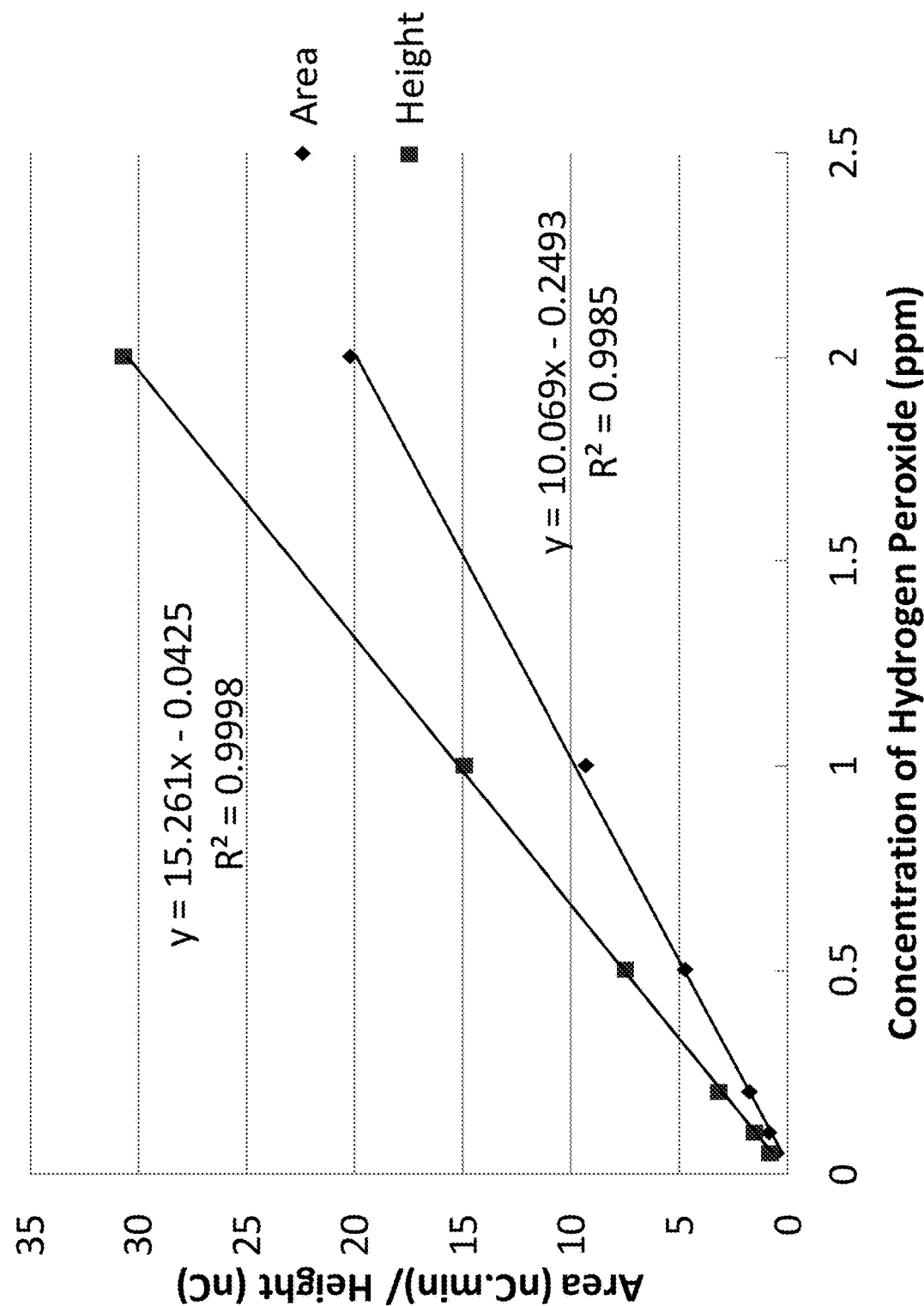
FIG. 8 shows two linear calibration plots of hydrogen peroxide using either a measured peak area (diamonds) or peak height (squares) from the chromatograms of FIG. 7.

The tested sample solutions contained hydrogen peroxide at one of the following concentrations, which are 50, 100, 200, 500, 1000 and 2000 ppb in 50 mM NaCl/50 mM NaOH. The chromatograms of FIG. 7 illustrated the following peaks: Peak 1—Void volume peak, Peak 2—Hydrogen peroxide, and Peak 3—Oxygen. FIG. 8 shows two linear calibration plots of hydrogen peroxide using either a measured peak area (diamonds) or peak height (squares) from the chromatograms of FIG. 7. Thus, hydrogen peroxide can be measured in an acidic eluent with a platinum electrode using the first reductive detection waveform.

Example 4

Figure 9:
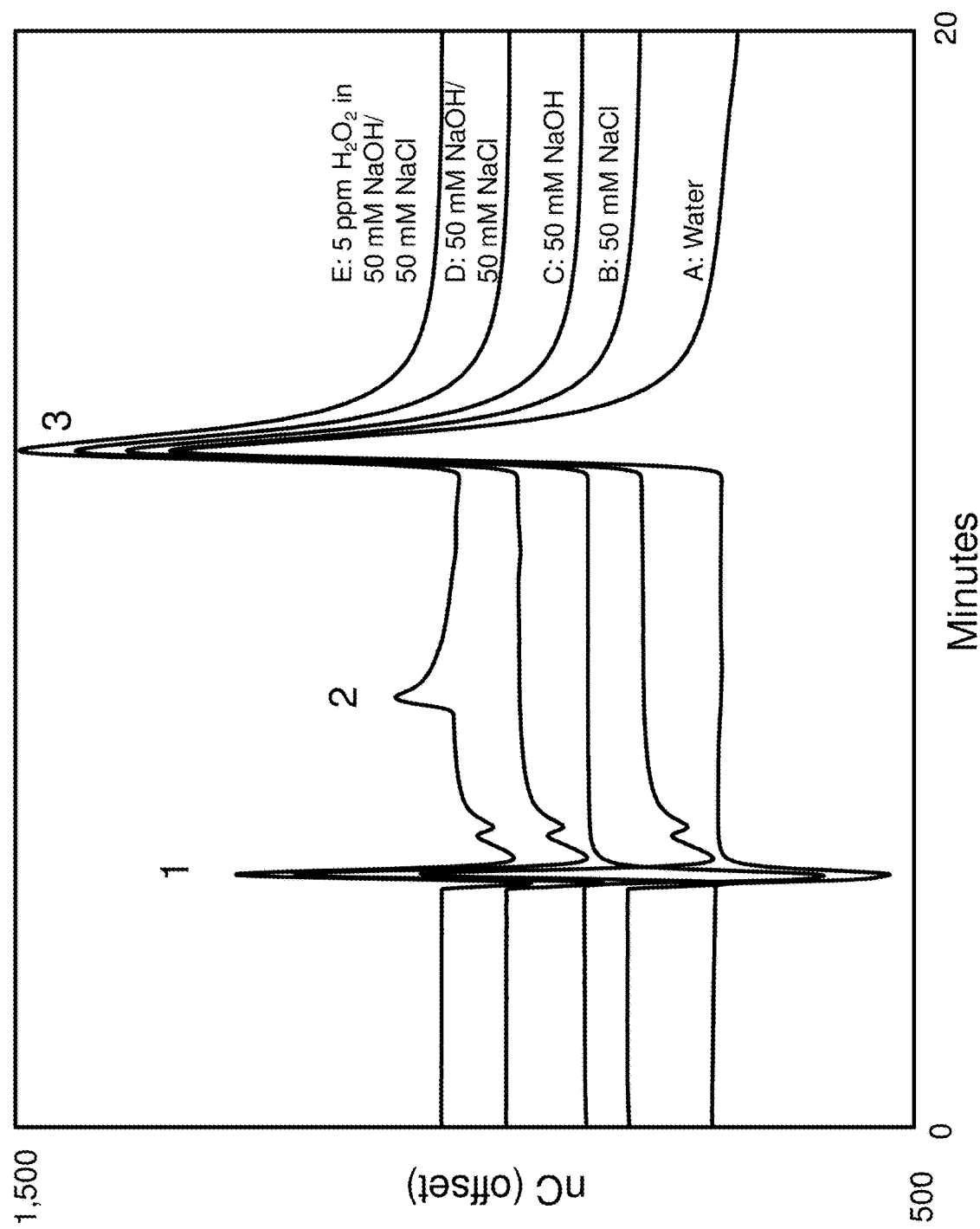
FIG. 9 shows a series of chromatograms using the first reductive detection waveform of FIG. 1 and an acidic eluent for testing various matrices, which are A: water, B: 50 mM NaCl, C: 50 mM NaOH, D: 50 mM NaOH/50 mM NaCl and E: 5 ppm $H_2O_2$ in 50 mM NaOH/50 mM NaCl. Peak 1—void volume peak, Peak 2—Hydrogen peroxide, peak 3—oxygen, and *—unknown peak.

Chromatograms were measured for an injection of A: water; B: 50 mM NaCl; C: 50 mM NaOH; D: 50 mM NaOH/50 mM NaCl; E: 5 ppm $H_2O_2$ in 50 mM NaOH/50 mM NaCl with the first reductive detection waveform of Table 1 in an acidic eluent along with a platinum working electrode, as shown in FIG. 9. A liquid chromatography system was assembled and operated under conditions similar to EXAMPLE 1.

The chromatograms of FIG. 9 illustrate the following peaks: Peak 1—Void volume peak, Peak 2—Hydrogen peroxide, Peak 3—Oxygen, and Peak *—unknown. FIG. 9 indicates that the signal due to a variety of different matrices in the sample is relatively flat in the time interval around the $H_2O_2$ peak (around 8 minutes). Consequently, the signal response using the first reductive detection waveform was not influenced by the type of matrix tested, which in this case was water, NaOH, NaCl or both NaOH and NaCl.

Example 5

Figure 10:
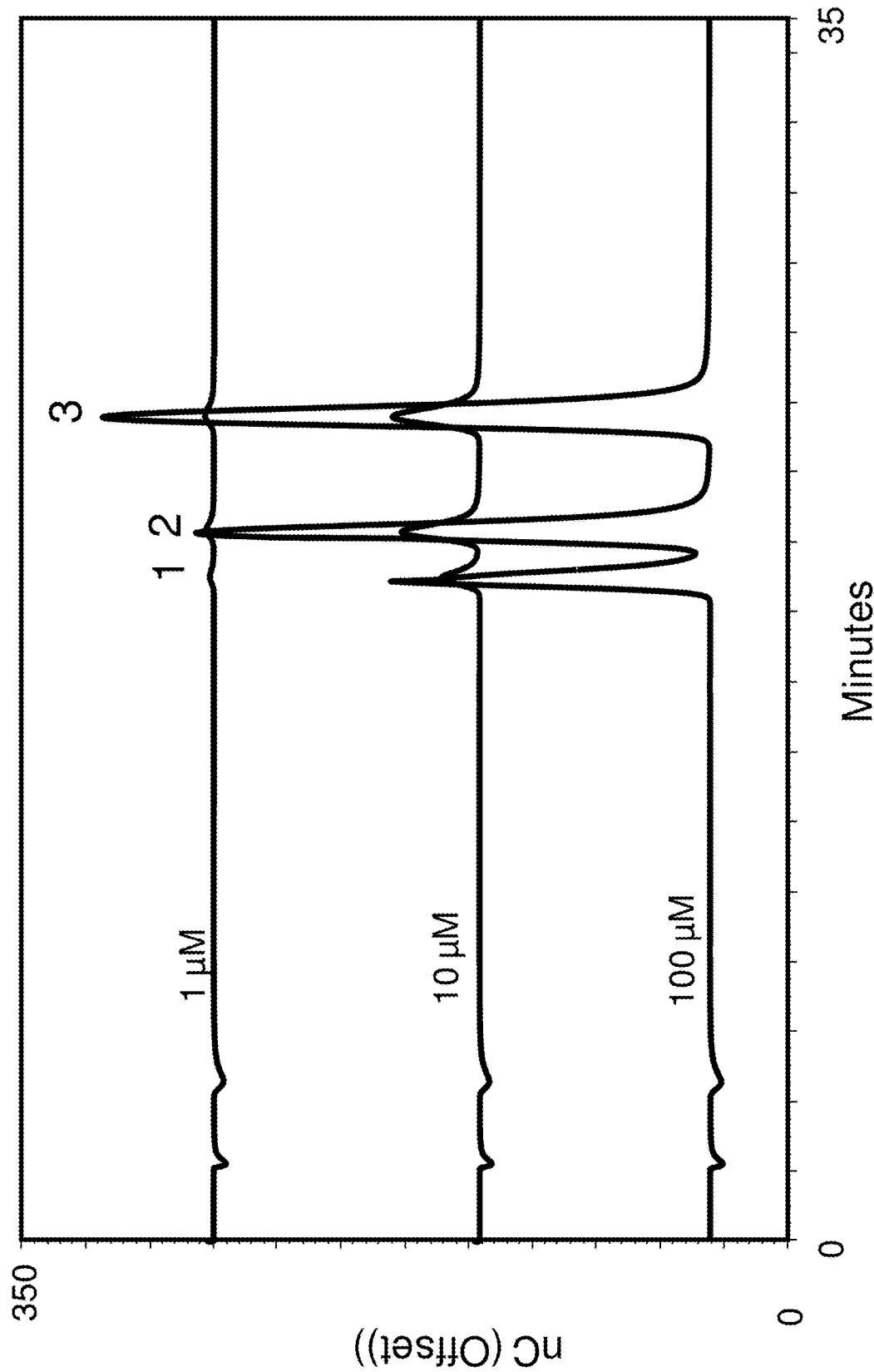
FIG. 10 shows a series of chromatograms using the third reductive detection waveform of FIG. 2 and an acidic eluent for testing various explosive samples, which are 4-nitrotoluene (NT, peak 1), 3,4-dinitrotoluene (DNT, peak 2), and 2,4,6 trinitrotoluene (TNT, peak 3).

In FIG. 10, a series of chromatograms were measured with various explosive samples, which are 4-nitrotoluene (NT, Peak 1), 3,4-dinitrotoluene (DNT, Peak 2), and 2,4,6 trinitrotoluene (TNT, Peak 3) using the third reductive detection waveform of Table 3 in an acidic eluent along with a BDD electrode. A liquid chromatography system was assembled and operated under conditions similar to EXAMPLE 1 except for the below listed experimental conditions.

Eluent:MeOH:$H_2O$ (50:50, V:V), 5 mM Methanesulfonic Acid (MSA)
Column: Acclaim™ PA2 C18 (120 Å, 3 µm, 2.1×150 mm)
Flow Rate: 0.15 mL/min
Temperature: 30° C.
Injection Volume: 10 µL
Reference Electrode: Ag/AgCl
Electrode: BDD
Detection Waveform: third reductive detection waveform of Table 3
Gasket Thickness: 2 mil
Samples: mixture of 4-nitrotoluene (NT, peak 1), 3,4-dinitrotoluene (DNT, peak 2), and 2,4,6 trinitrotoluene (TNT, peak 3) where each toluene species was at an equal concentration. The sample had one of the following concentrations for each of the toluene species, which are 1, 10 and 100 µM.

The Thermo Scientific Acclaim™ PA is a polar embedded reverse phase column that includes 3 µm silica particles with 120 Å pores. FIG. 10 indicates that an explosive sample containing a mixture of NT, DNT, and TNT can be separated and measured in a chromatographic separation using the third reductive detection waveform of Table 3.

Example 6

Figure 11:
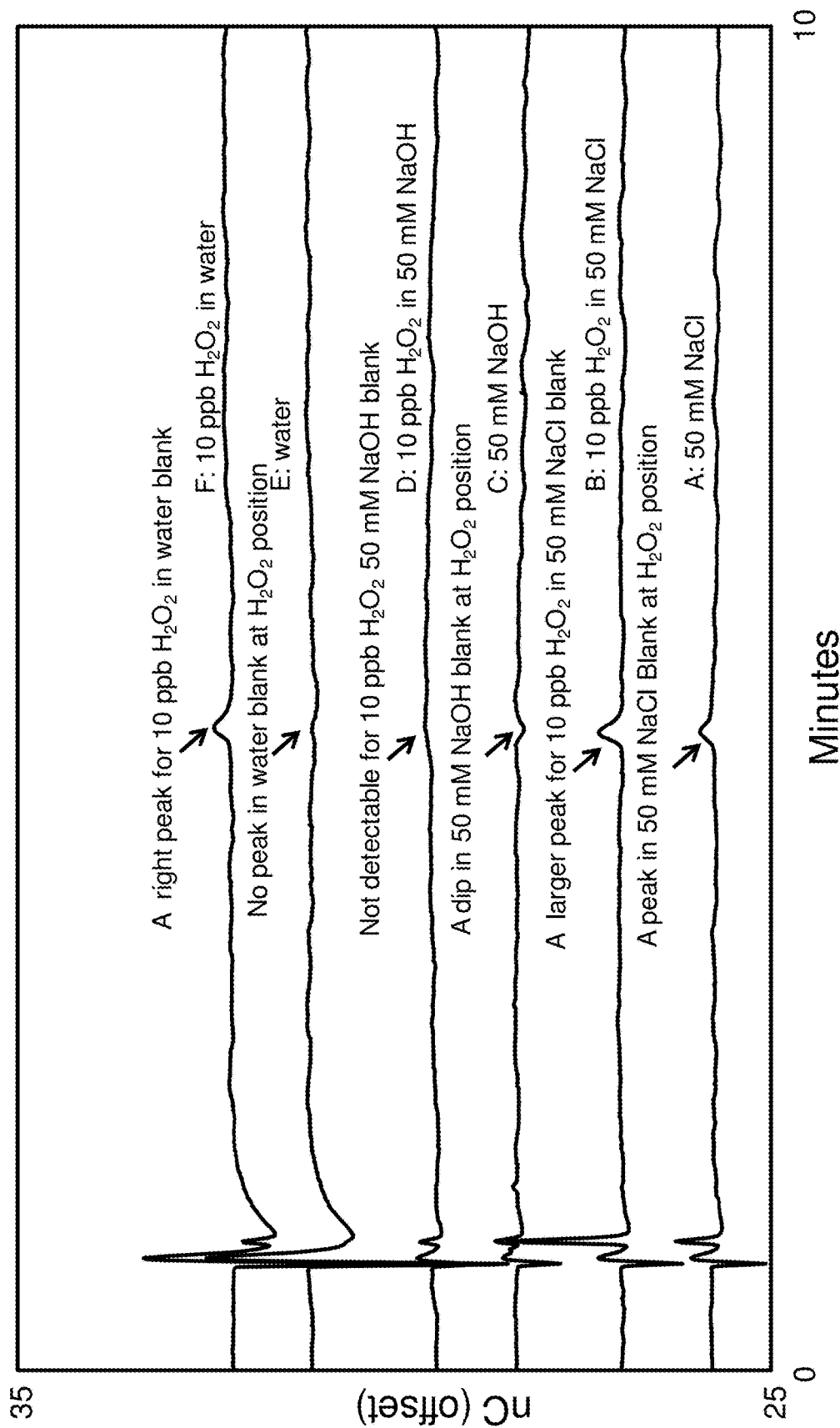
FIG. 11 shows a series of chromatograms using a quadruple waveform, in which an oxidative voltage was used to measure a signal in an alkaline eluent with different types of matrices, which are A: 50 mM NaCl, B: 10 ppb $H_2O_2$ in 50 mM NaCl, C: 50 mM NaOH, D: 10 ppb $H_2O_2$ in 50 mM NaOH, E: water, and F: 10 ppb $H_2O_2$ in water.

In FIG. 11, a series of chromatograms were measured with different types of samples containing various matrices using a quadruple waveform that included an oxidation voltage (see Table 5 below) to detect the analyte hydrogen peroxide.

TABLE 5

| Time (s) | Potential (V) | Integration |
|---|---|---|
| 0.00 | 0.10 | |
| 0.20 | 0.10 | Start |
| 0.40 | 0.10 | End |
| 0.41 | −2.00 | |

TABLE 5-continued

| Time (s) | Potential (V) | Integration |
|---|---|---|
| 0.42 | −2.00 | |
| 0.43 | +0.60 | |
| 0.44 | −0.10 | |
| 0.50 | −0.10 | |

An alkaline eluent along with a gold working electrode was used. A liquid chromatography system was assembled and operated under conditions similar to EXAMPLE 1, except for the below listed experimental conditions.

Column: Dionex CarboPac™ PA20 (3 mm×150 mm)
Eluent: 50 mM KOH (eluent generator with CR-ATC)
Flow Rate: 0.50 mL/min
Temperature: 30° C.
Injection Volume: 10 µL
Reference Electrode: Ag/AgCl
Electrode: disposable PTFE gold working
Detection Waveform: quadruple waveform including of Table 5
Gasket Thickness: 2 mil The Dionex CarboPac™ PA20 (3 mm×150 mm) is a chromatography column containing hydrophobic, polymeric, pellicular anion exchange resin. This resin includes a 6 micron particle that are microporous pore size <10 angstroms, 55% crosslinking, and 65 microequivalents per column. In addition, the resin includes latex particles with difunctional quaternary ammonium ion, 130 nanometer diameter, and 5.2% crosslinking. The CR-ATC is a continuously regenerated anion trap (commercially available from Thermo Fisher Scientific, Sunnyvale, Calif.) that is placed in between the eluent generator and the sample injector to remove impurities.

In order to demonstrate the matrix interference drawbacks of the quadruple waveform that includes an oxidation voltage, it was tested in three different matrices with and without $H_2O_2$. The tested sample solutions contained either $H_2O$, 50 mM NaOH, or 50 mM NaCl as a matrix that may be contained in a hydrogen peroxide sample. Accurate hydrogen peroxide analysis may be needed for samples that contain matrix ions such as NaOH and NaCl. A sample blank containing only $H_2O$ without hydrogen peroxide showed a relatively flat oxidation signal in the area where a hydrogen peroxide peak is predicted to occur at about 5 minutes (see chromatogram E of FIG. 11). A sample containing only 50 mM NaOH without hydrogen peroxide showed a dip in signal response around 5 minutes (see chromatogram C of FIG. 11). In contrast, a sample blank containing only 50 mM NaCl without hydrogen peroxide showed a positive peak signal response (oxidation) around 5 minutes (see chromatogram A of FIG. 11). It should be noted that the oxidative charge values measured with the oxidation voltage were also displayed as positive values. A 10 ppb hydrogen peroxide sample was tested in three different matrices, which were water, 50 mM NaOH, and 50 mM NaCl, as illustrated in chromatograms F, D, and B of FIG. 11, respectively. The hydrogen peroxide signal in the three different matrices showed various responses. The magnitude of the signal responses were in the order of 50 mM NaCl>water>50 mM NaOH. The response of 10 ppb $H_2O_2$ was elevated due to the positive peak contribution of the 50 mM NaCl matrix, but the response of 10 ppb $H_2O_2$ was not detectable due to the negative dip from the 50 mM NaOH matrix. The response of 10 ppb $H_2O_2$ in water did not have an interfering matrix effect because water did not cause a change in signal response at the time interval where hydrogen peroxide elutes. Therefore, FIG. 11 indicated that there is a matrix interference effect with NaCl or NaOH when oxidizing hydrogen peroxide at gold electrodes in the presence of sodium chloride and/or sodium hydroxide.

Example 7

Figure 12:
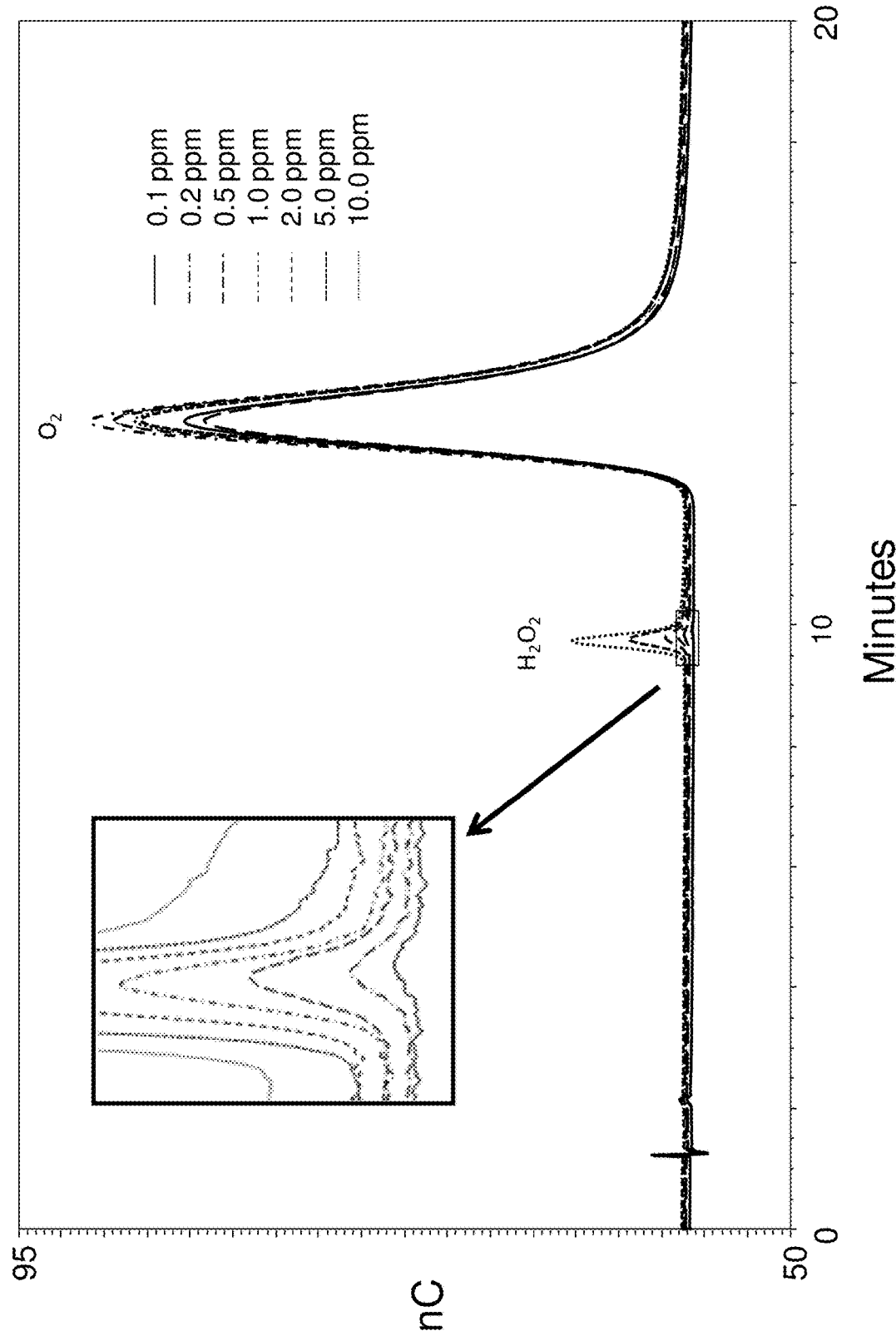
FIG. 12 shows a series of chromatograms using the fourth reductive detection waveform of FIG. 3 and an alkaline eluent for testing various concentrations of hydrogen peroxide samples from 0.1 ppm to 10.0 ppm.

In FIG. 12, a series of chromatograms were measured with a sample containing hydrogen peroxide using a fourth reductive detection waveform of Table 4 in an alkaline eluent along with a disposable gold working electrode. An ion exchange chromatography system was assembled in a format similar to FIG. 14, which in this case was a Thermo Scientific Dionex ICS-5000 system with an electrochemical detector (commercially available from Thermo Fisher Scientific, Sunnyvale, Calif.).

Figure 13:
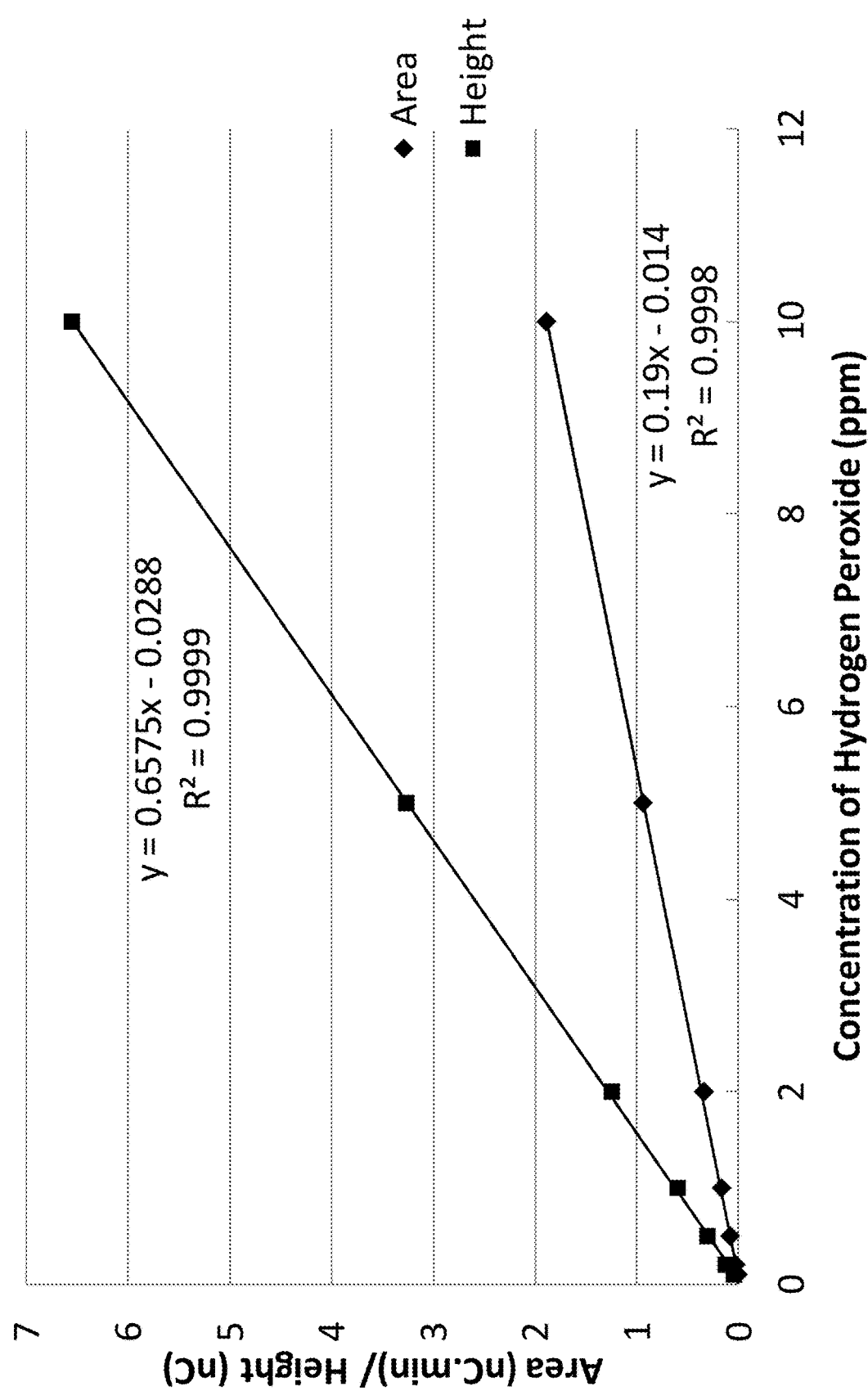
FIG. 13 shows two linear calibration plots of hydrogen peroxide using either a measured peak area (diamonds) or peak height (squares) from the chromatograms of FIG. 12.

The experimental conditions included:
Eluent: 30 mM KOH (eluent generator)
Column: Dionex IonPac™ AS7 (analytical: 2×250 mm; guard: 2×50 mm)
Flow rate: 0.30 mL/min
Temperature: 30° C.
Injection Volume: 5 µL
Reference electrode: Ag/AgCl
Working electrode: Au
Detection Waveform: fourth reductive detection waveform of Table 4
Samples: hydrogen peroxide in 50 mM NaCl/50 mM NaOH at a concentration of 0.1, 0.2, 0.5, 1.0, 2.0, 5.0, or 10.0 ppm FIG. 13 shows two linear calibration plots of hydrogen peroxide using either a measured peak area (diamonds) or peak height (squares) from the chromatograms of FIG. 12. The Dionex IonPac™ AS7 is a chromatography column containing 10 micron particle, 2% crosslinking, and 100 microequivalents per column, and alkyl quaternary ammonium functional groups. In this example, the hydrogen peroxide signal response was stable. The variation of hydrogen peroxide response was less than 5% over a period of 7 days. In addition, Applicant did not observe fouling on the gold electrode surface through the formation of a black surface layer.

Example 8

Figure 16:
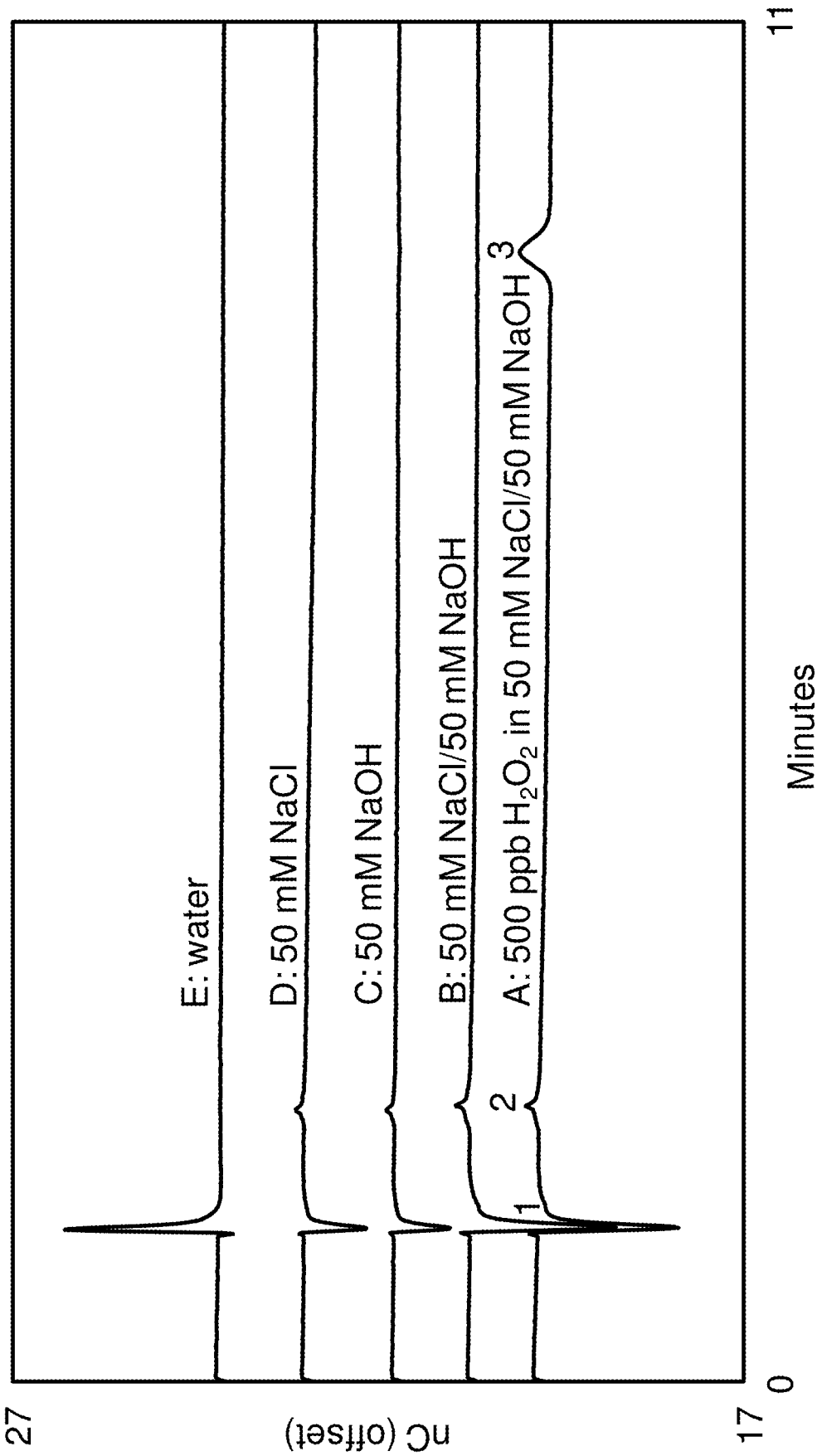
FIG. 16 shows a series of chromatograms using the fourth reductive waveform of FIG. 3 and an alkaline eluent with different types of matrices, which are A: 500 ppb $H_2O_2$ in 50 mM NaCl/50 mM NaOH, B: 50 mM NaCl/50 mM NaOH, C: 50 mM NaOH, D: 50 mM NaCl, and E: water. Peak 1—a void volume peak, Peak 2—unknown, and Peak 3—hydrogen peroxide.

Chromatograms were measured for an injection of 500 ppb $H_2O_2$ in 50 mM NaCl/50 mM NaOH (A), 50 mM NaCl/50 mM NaOH (B), 50 mM NaOH (C), 50 mM NaCl (D), and water (E) to test different matrices using a fourth reductive detection waveform of Table 4 in an alkaline eluent along with a gold working electrode, as shown in FIG. 16. A liquid chromatography system was assembled and operated under conditions similar to EXAMPLE 7.

The chromatograms of FIG. 16 illustrate the following peaks: Peak 1—Void volume peak, Peak 2—Unknown, and peak 3—Hydrogen peroxide. All of the matrix samples tested showed no interference with the hydrogen peroxide peak. FIG. 16 indicated that the signal response using the fourth reductive detection waveform was not influenced by the tested matrix components, which in this case was NaOH or NaCl. Thus, NaOH or NaCl in the sample were found to not interfere with the reduction measurement of hydrogen peroxide at gold electrodes. Clearly, compared to the quadruple waveforms of EXAMPLE 6 that used an oxidation value for measuring hydrogen peroxide, the reductive detection waveforms described herein allowed for the accurate measurement of hydrogen peroxide in alkaline conditions with gold electrodes in the presence of matrix species such as sodium chloride and sodium hydroxide.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A method of analyzing a sample at an electrochemical detector fluidically coupled to a chromatography column, the method comprising:
    flowing an eluent and the sample to the chromatography column, in which the sample comprises arsenate and arsenite, and the eluent is acidic;
    separating the arsenate from the arsenite in the chromatography column in a single chromatogram;
    outputting the arsenate and the arsenite from the chromatography column to the electrochemical detector at different times;
    applying a plurality of reductive detection waveforms to the electrochemical detector, the electrochemical detector comprising a working electrode, a reference electrode, and a flow channel, where each of the reductive detection waveforms includes:
    a) a constant first oxidizing voltage is applied between the working electrode and the reference electrode for a first predetermined time interval;
    b) immediately subsequent to the first predetermined time interval, a constant second oxidizing voltage is applied between the working electrode and the reference electrode for a second predetermined time interval, in which the constant second oxidizing voltage is greater than the constant first oxidizing voltage; and
    c) immediately subsequent to the second predetermined time interval, a reducing voltage is applied between the working electrode and the reference electrode for a third predetermined time interval, in which the arsenate or the arsenite is reduced at the working electrode and causes an electron to be added to the arsenate or the arsenite during the third predetermined time interval, in which the constant reducing voltage is less than the constant first oxidizing voltage and the constant second oxidizing voltage;
    measuring one or more reducing current values, or one or more reducing charge values during at least part of the third predetermined time interval for each of the reductive detection waveforms;
    calculating a concentration of the arsenate based on the measured one or more reducing current values, or the measured one or more reducing charge values during the at least part of the third predetermined time interval for at least one of the reductive detection waveforms; and calculating a concentration of the arsenite based on the measured one or more reducing current values, or the measured one or more reducing charge values during the at least part of the third predetermined time interval for at least another one of the reductive detection waveforms.

2. The method of claim 1 further comprising:

sequentially applying the plurality of the reductive detection waveforms;

measuring the one or more current values, or the one or more charge values during at least part of the third predetermined time interval for each of the sequentially applied reductive detection waveforms;

calculating a signal value based on the measured one or more current values, or the measured one or more charge values for each of the sequentially applied reductive detection waveforms; and displaying the signal value as a function of time for each of the sequentially applied reductive detection waveforms.

3. The method of claim 2, in which the signal value is based on a sum of the measured current or charge values for each of the sequentially applied reductive detection waveforms.

4. The method of claim 2, in which the displayed signal value as the function of time for each of the sequentially applied reductive detection waveforms form a chromatographic peak.

5. The method of claim 1, in which the one or more current values or the one or more charge values measured are during a last 50% of the third predetermined time interval.

6. A method of analyzing a sample at an electrochemical detector fluidically coupled to a chromatography column, the method comprising:

flowing an eluent and the sample to the chromatography column, in which the sample comprises peroxide and chloride, and the eluent is acidic;

separating at least one analyte in the chromatography column, in which the at least one analyte includes the peroxide;

outputting the at least one analyte from the chromatography column to the electrochemical detector;

applying a plurality of reductive detection waveforms to the electrochemical detector, the electrochemical detector comprising a working electrode, a reference electrode, and a flow channel, where each of the reductive detection waveforms includes:

a) a constant first oxidizing voltage is applied between the working electrode and the reference electrode for a first predetermined time interval;

b) immediately subsequent to the first predetermined time interval, a constant second oxidizing voltage is applied between the working electrode and the reference electrode for a second predetermined time interval, in which the constant second oxidizing voltage is greater than the constant first oxidizing voltage; and c) immediately subsequent to the second predetermined time interval, a constant reducing voltage is applied between the working electrode and the reference electrode for a third predetermined time interval, in which the peroxide is reduced at the working electrode and causes an electron to be added to the peroxide during the third predetermined time interval, in which the constant reducing voltage is less than the constant first oxidizing voltage and the constant second oxidizing voltage, respectively;

measuring one or more reducing current values, or one or more reducing charge values during at least part of the third predetermined time interval for each of the reductive waveforms; and calculating a concentration of the peroxide based on the measured one or more reducing current values, or the measured one or more reducing charge values during the at least part of the third predetermined time interval for at least one of the reductive waveforms.

7. The method of claim 6 further comprising:

sequentially applying the plurality of the reductive detection waveforms;

measuring the one or more current values, or the one or more charge values during at least part of the third predetermined time interval for each of the sequentially applied reductive detection waveforms;

calculating a signal value based on the measured one or more current values, or the measured one or more charge values for each of the sequentially applied reductive detection waveforms; and displaying the signal value as a function of time for each of the sequentially applied reductive detection waveforms.

8. The method of claim 7, in which the signal value is based on a sum of the measured current or charge values for each of the sequentially applied reductive detection waveforms.

9. The method of claim 8, in which the displayed signal value as the function of time for each of the sequentially applied reductive detection waveforms form a chromatographic peak.

10. The method of claim 6, in which the one or more current values or the one or more charge values measured are during a last 50% of the third predetermined time interval.

\* \* \* \* \*